(12) United States Patent
Maruyama et al.

(10) Patent No.: US 12,472,795 B2
(45) Date of Patent: Nov. 18, 2025

(54) TEMPERATURE CONTROL SYSTEM

(71) Applicant: Marelli Corporation, Saitama (JP)

(72) Inventors: Tomohiro Maruyama, Saitama (JP); Tooru Kawamata, Saitama (JP); Kouji Hirono, Saitama (JP)

(73) Assignee: Marelli Corporation, Saitama (JP)

( * ) Notice: Subject to any disclaimer, the term of this patent is extended or adjusted under 35 U.S.C. 154(b) by 186 days.

(21) Appl. No.: 18/580,261

(22) PCT Filed: Jul. 20, 2022

(86) PCT No.: PCT/JP2022/028228
§ 371 (c)(1),
(2) Date: Jan. 18, 2024

(87) PCT Pub. No.: WO2023/003020
PCT Pub. Date: Jan. 26, 2023

(65) Prior Publication Data
US 2024/0343086 A1    Oct. 17, 2024

(30) Foreign Application Priority Data
Jul. 21, 2021   (JP) ................................. 2021-120536

(51) Int. Cl.
*B60H 1/00*   (2006.01)

(52) U.S. Cl.
CPC ..... *B60H 1/00278* (2013.01); *B60H 1/00885* (2013.01); *B60H 2001/00307* (2013.01); *B60H 2001/00928* (2013.01)

(58) Field of Classification Search
CPC .............................. B60H 1/00278; B60H 1/00
(Continued)

(56) References Cited

U.S. PATENT DOCUMENTS

| 2014/0318170 A1 | 10/2014 | Katoh et al. |
| 2019/0366800 A1 | 12/2019 | Durrani et al. |

(Continued)

FOREIGN PATENT DOCUMENTS

| FR | 3075109 A1 | 6/2019 |
| JP | 2013-139995 A | 7/2013 |

(Continued)

*Primary Examiner* — Davis D Hwu
(74) *Attorney, Agent, or Firm* — Young Basile Hanlon & MacFarlane, P.C.

(57) ABSTRACT

A temperature control system for a vehicle includes a refrigeration cycle circuit and a cooling water circuit. The refrigeration cycle circuit includes a compressor, a radiator, and a first heat exchanger that exchanges heat between refrigerant and cooling water. The cooling water circuit includes a first cooling water circuit including the first heat exchanger, a storage battery heat exchanger, and a first pump; a second cooling water circuit including an external heat exchanger, a drive system heat exchanger that exchanges heat with a drive system component, and a second pump; a first thermal coupler that switches the cooling water circulating through the first cooling water circuit and the cooling water circulating through the second cooling water circuit between thermal coupling and separation; and a bypass circuit that includes an on-off valve connected to upstream and downstream of the external heat exchanger, provided in parallel with the first cooling water circuit.

12 Claims, 18 Drawing Sheets

(58) Field of Classification Search
USPC .......................................................... 165/202
See application file for complete search history.

(56) References Cited

U.S. PATENT DOCUMENTS

| | | |
|---|---|---|
| 2021/0188043 A1 | 6/2021 | Smith et al. |
| 2021/0316594 A1 | 10/2021 | Kawano et al. |
| 2022/0024279 A1 | 1/2022 | Fukui et al. |

FOREIGN PATENT DOCUMENTS

| | | | |
|---|---|---|---|
| JP | 2019-034587 A | 3/2019 | |
| JP | 2020-104670 A | 7/2020 | |
| JP | 2020-142789 A | 9/2020 | |
| WO | WO2012144151 A1 * | 10/2012 | .............. B60L 58/26 |

* cited by examiner

☐ FIVE MODES BY VALVE SWITCHING
|     | #1 | #2 | #3 | #4 | #5 |
|-----|----|----|----|----|----|
| #1  | S  | S  | S  | P  | P  |
| #2  | S  | P  | P  | S  | S  |
| #3  | P  | P  | S  | S  | P  |
| S/V | O  | C  | O  | O  | C  |
S:  Series  O: Open
P:  Pararrel  C: Close
FIG. 3

| MODE | No.1 | No.2 | No.3 | No.4 | No.5 | No.6 | No.7 | No.8 | No.9 | No.10 |
|---|---|---|---|---|---|---|---|---|---|---|
| e-PT | HEAT RECOVERY | HEAT RECOVERY | HEAT RECOVERY | Rad HEAT RADIATION | Rad HEAT RADIATION | — | Rad HEAT RADIATION | Rad HEAT RADIATION | Rad HEAT RADIATION | Rad HEAT RADIATION |
| Batt. | HEAT RECOVERY | CIRCULATION | Rad HEAT RADIATION | Rad HEAT RADIATION | Chiller HEAT RADIATION | HEAT RETAINING | Rad HEAT RADIATION | Rad HEAT RADIATION | Chiller HEAT RADIATION | Chiller HEAT RADIATION |
| H/P MODE | HEATING | DEHUMIDIFI-CATION HEATING | DEHUMIDIFI-CATION HEATING | DEHUMIDIFI-CATION (COOLING) | COOLING | — | — | HEATING | — | COOLING |
| #1 | Series | Series | Series | Pararrel | Pararrel | Pararrel | Pararrel | Pararrel | Pararrel | Pararrel |
| #2 | Series | Pararrel | Pararrel | Series | Series | Series | Series | Series | Series | Series |
| #3 | Pararrel | Pararrel | Series | Series | Pararrel | Pararrel | Series | Series | Pararrel | Pararrel |
| S/V | Open | Close | Open | Open | Close | Close | Open | Open | Close | Close |
| HVWH | On | Off | Off | Off | Off | On | Off | Off | Off | Off |
| C/fan | MAP CONTROL BASED ON LT-rad TEMPERATURE, H/P_Pd, AND VEHICLE SPEED | | | | | | | | | |

FIG. 14

| OUTSIDE AIR TEMPERATURE | LOW TEMPERATURE | INTERMEDIATE TEMPERATURE | HIGH TEMPERATURE |
|---|---|---|---|
| Intake | FRE | | REC |
| HP | Heat | DRY(Heat) | DRY(COOL) | COOL |
| EDC | Pd_contorole | | |
| EXV#1 | Tint_contorole(min_opening) | | Tint_contorole(with Ps_cut) |
| EXV#2 | Sub-cool_contorole | | Sub_cool_controle(or amb,incar_map) |
| S/V#1 | close | | Tw Batt. | open |
| S/V#2 | open | | close |

FIG. 15

| H/P MODE | HEATING | | DEHUMIDIFICATION (HEATING) | | DEHUMIDIFICATION (COOLING) | | COOLING | | REFRIGERANT RECOVERY |
|---|---|---|---|---|---|---|---|---|---|
| Batt. REQUEST | YES | NO | YES | NO | YES | NO | YES | NO | — |
| EDC | Pd CONTROL | Pd CONTROL | Pd CONTROL | Pd CONTROL | Tint (Ps LIMITATION) | | Tint (Ps LIMITATION) | | ROTATION SPEED CONTROL |
| EXV#1 | close | close | Tint (min OPENING DEGREE on/off) | | SC CONTROL (amb,incar MAP CONTROL) | | | | HALF-OPEN |
| EXV#2 | SC CONTROL | | SC CONTROL | close | Tw_batt. | close | Tw_batt. | close | HALF-OPEN |
| S/V#1 | close | | close | | open | | open | | close |
| S/V#2 | Open | | Open | | close | | close | | close |

| | Valve pattern #1 | Valve pattern #2 | Valve pattern #3 | Valve pattern #4 | Valve pattern #5 | Valve pattern #6 |
|---|---|---|---|---|---|---|
| OUTSIDE AIR | -10°C OR LOWER | 0°C OR LOWER | (-10°C~15°C) | (0~15°C) | (15~25°C) | (25°C OR HIGHER) |
| SYSTEM DIAGRAM | | | | | | |
| HP | HEATING | HEATING OR DEHUMIDIFICATION HEATING | HEATING OR DEHUMIDIFICATION HEATING | HEATING OR DEHUMIDIFICATION HEATING | DEHUMIDIFICATION (COOLING) | COOLING |
| ePT | HEAT RECOVERY | HEAT STORAGE | HEAT RECOVERY (+ RAD HEAT ABSORPTION) | RAD HEAT RADIATION (+HEAT RECOVERY) | RAD HEAT RADIATION | RAD HEAT RADIATION |
| Batt | HEAT RECOVERY | HEAT RECOVERY | HEAT STORAGE | RAD HEAT RADIATION | RAD HEAT RADIATION + (Chiller HEAT RADIATION) | Chiller HEAT RADIATION |
| HVWH | BATT WARM, HEAT RECOVERY | BATT WARM | - | - | - | - |

TEMPERATURE CONTROL SYSTEM

CROSS-REFERENCE TO RELATED APPLICATION(S)

This application is a national stage 371 application of PCT/JP2022/028228, filed on Jul. 20, 2022, which claims priority to and the benefit of Japanese Application Patent Serial No. 2021-120536, filed Jul. 21, 2021, the entire disclosures of which are hereby incorporated by reference.

TECHNICAL FIELD

The present invention relates to a temperature control system for a vehicle.

SUMMARY

An object of the present invention is to provide a temperature control system that combines a refrigeration cycle circuit and a cooling water circuit and is capable of performing various types of control such as air conditioning, storage battery temperature control, and waste heat utilization with a simple configuration.

According to an aspect of the present invention, a temperature control system for a vehicle, the temperature control system includes: a refrigeration cycle circuit configured to allow a refrigerant to circulate therethrough; and a cooling water circuit configured to allow cooling water to circulate therethrough, wherein the refrigeration cycle circuit includes a compressor configured to compress the refrigerant, a radiator configured to heat air used for air conditioning using heat of the refrigerant compressed by the compressor, and a first heat exchanger configured to exchange heat between the refrigerant and the cooling water in the cooling water circuit, and the cooling water circuit includes a first cooling water circuit including the first heat exchanger, a storage battery heat exchanger configured to exchange heat with a storage battery, and a first pump configured to suction and discharge the cooling water, and configured to allow the cooling water to circulate therethrough, a second cooling water circuit including an external heat exchanger configured to exchange heat between the cooling water and outside air, a drive system heat exchanger configured to exchange heat with a drive system component that drives the vehicle, and a second pump configured to suction and discharge the cooling water, and configured to allow the cooling water to circulate therethrough, a first thermal coupler configured to switch the cooling water circulating through the first cooling water circuit and the cooling water circulating through the second cooling water circuit between thermal coupling and separation, and a bypass circuit including an on-off valve capable of blocking a flow of the cooling water, connected to upstream and downstream of the external heat exchanger, and provided in parallel with the first cooling water circuit.

According to the above aspect, it is possible to provide a temperature control system that combines a refrigeration cycle circuit and a cooling water circuit and is capable of performing various controls such as air conditioning, storage battery temperature control, and waste heat utilization with a simple configuration.

BRIEF DESCRIPTION OF THE DRAWINGS

FIG. 3 is a diagram illustrating switching of operation modes of a cooling water circuit by valve switching;

FIG. 14 is a diagram illustrating the operation modes of the temperature control system;

FIG. 15 is a diagram illustrating operations of devices of a refrigeration cycle circuit H/P with respect to the outside air temperature;

FIG. 16 is a diagram illustrating the operations of the devices of the refrigeration cycle circuit H/P in each operation mode of an air conditioner;

FIG. 19 is a diagram illustrating operation modes of the cooling water circuit according to the modification of the embodiment of the present invention.

DETAILED DESCRIPTION

Hereinafter, a temperature control system 100 according to an embodiment of the present invention will be described with reference to the drawings.

Figure 1:
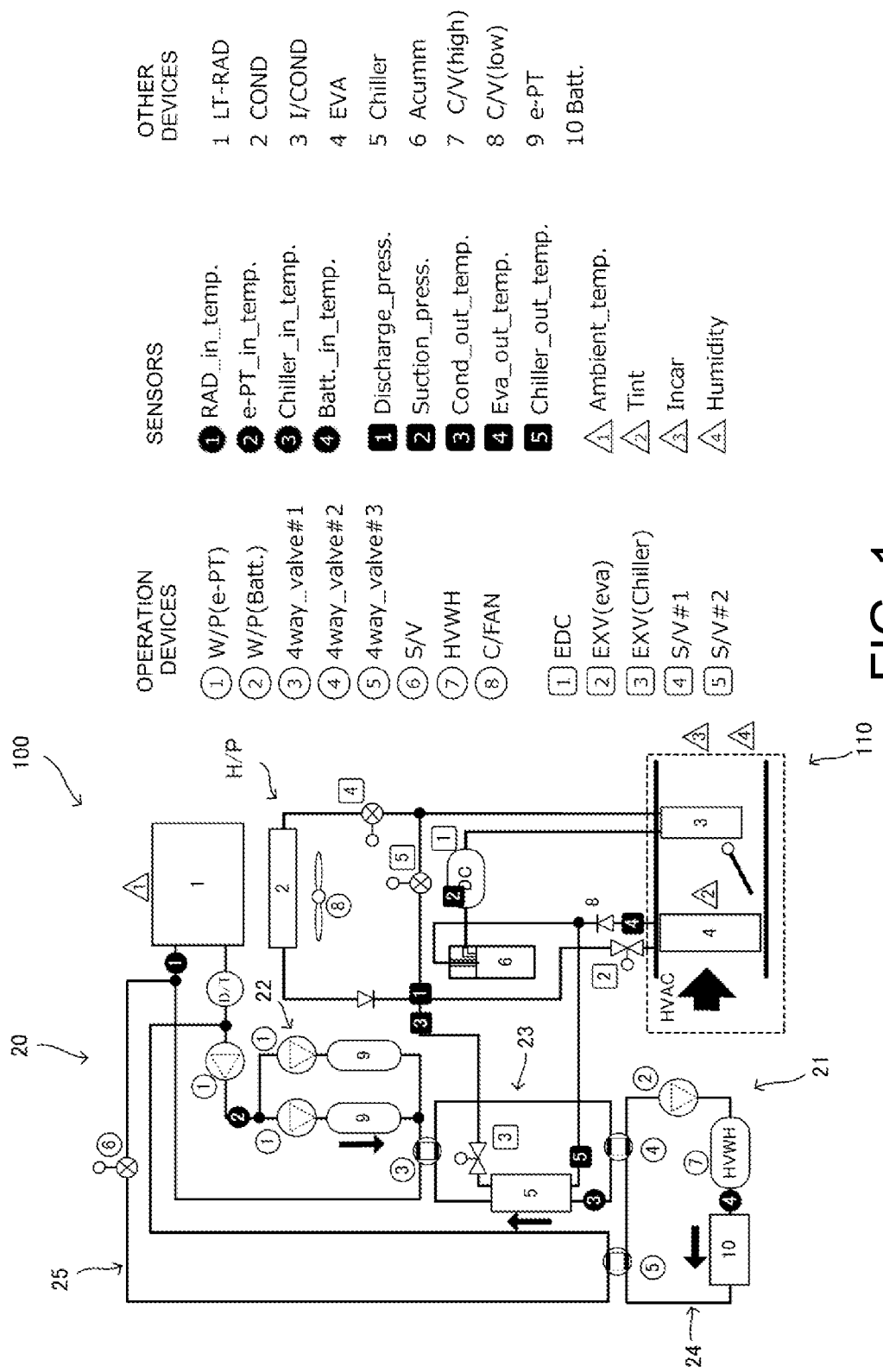
FIG. 1 is a configuration diagram of a temperature control system according to an embodiment of the present invention.

First, an overall configuration of the temperature control system 100 will be described with reference to FIG. 1. FIG. 1 is a configuration diagram of the temperature control system 100.

The temperature control system 100 is a system mounted on a vehicle, and adjusts a temperature of a storage battery Batt. and performs air conditioning of a vehicle interior. The temperature control system 100 includes an air conditioner 110 and a cooling water circuit 20 through which cooling water circulates.

The air conditioner 110 includes a heating ventilation and air conditioning (HVAC) unit through which air used for air conditioning passes, a refrigeration cycle circuit H/P through which a refrigerant circulates, and a controller.

The HVAC unit cools or heats the air used for air conditioning. The HVAC unit includes a blower, an air mix door, and a case that surrounds the blower so that air used for air conditioning can pass therethrough. An evaporator EVA and a heater core I/COND of the refrigeration cycle circuit H/P are disposed in the HVAC unit. The air blown from the blower exchanges heat with a refrigerant flowing in the evaporator EVA and with a refrigerant flowing in the heater core I/COND.

The refrigeration cycle circuit H/P includes an electric compressor EDC as a compressor, the heater core I/COND as a radiator, an outdoor heat exchanger COND, a gas-liquid separator Acumm, the evaporator EVA as an evaporator, a cooling water-refrigerant heat exchanger Chiller as a first heat exchanger, an electric expansion valve EXV (eva), an electric expansion valve EXV (Chiller), a shut valve S/V (COND), a shut valve S/V (Chiller), a check valve C/V (high), and a check valve C/V (Low).

The cooling water circuit 20 includes a first cooling water circuit 21, a second cooling water circuit 22, a bypass circuit 25, a first thermal coupler 4way_valve #1, a second thermal coupler 4way_valve #2, and a third thermal coupler 4way_valve #3. The first cooling water circuit 21 includes a third cooling water circuit 23, a fourth cooling water circuit 24, and the second thermal coupler 4way_valve #2.

The first cooling water circuit 21 includes the cooling water-refrigerant heat exchanger Chiller, a first pump W/P (Batt.), a high-voltage hot water heater HVWH as a cooling water heater, a storage battery heat exchanger that exchanges heat with the storage battery Batt., and the second thermal coupler 4way_valve #2. The first cooling water circuit 21 can be switched between thermal coupling and separation with the second cooling water circuit 22 by the first thermal coupler 4way_valve #1. The first cooling water circuit 21 can be switched between thermal coupling and separation with the bypass circuit 25 by the third thermal coupler 4way_valve #3.

The second cooling water circuit 22 includes an external heat exchanger LT-RAD in which the cooling water and outside air exchange heat, a degassing tank D/T, a plurality of second pumps W/P (e-PT), and a pair of drive system heat exchangers that respectively exchange heat with the pair of drive system components e-PT. The second cooling water circuit 22 can be switched between thermal coupling and separation with the first cooling water circuit 21 by the first thermal coupler 4way_valve #1.

The third cooling water circuit 23 includes the cooling water-refrigerant heat exchanger Chiller. The third cooling water circuit 23 can be switched between thermal coupling and separation with the second cooling water circuit 22 by the first thermal coupler 4way_valve #1. The third cooling water circuit 23 can be switched between thermal coupling and separation with the fourth cooling water circuit 24 by the second thermal coupler 4way_valve #2.

The fourth cooling water circuit 24 includes the first pump W/P(Batt.), the storage battery heat exchanger that exchanges heat with the storage battery Batt., and the high-voltage hot water heater HVWH. The fourth cooling water circuit 24 can be switched between thermal coupling and separation with the third cooling water circuit 23 by the second thermal coupler 4way_valve #2. The fourth cooling water circuit 24 can be switched between thermal coupling and separation with the bypass circuit 25 by the third thermal coupler 4way_valve #3.

The bypass circuit 25 includes an on-off valve S/V capable of blocking a flow of the cooling water, is connected to the upstream and downstream of the external heat exchanger LT-RAD, and is provided in parallel with the first cooling water circuit 21. The bypass circuit 25 can be switched between thermal coupling and separation with the fourth cooling water circuit 24 (first cooling water circuit 21) by the third thermal coupler 4way_valve #3.

Figure 2:
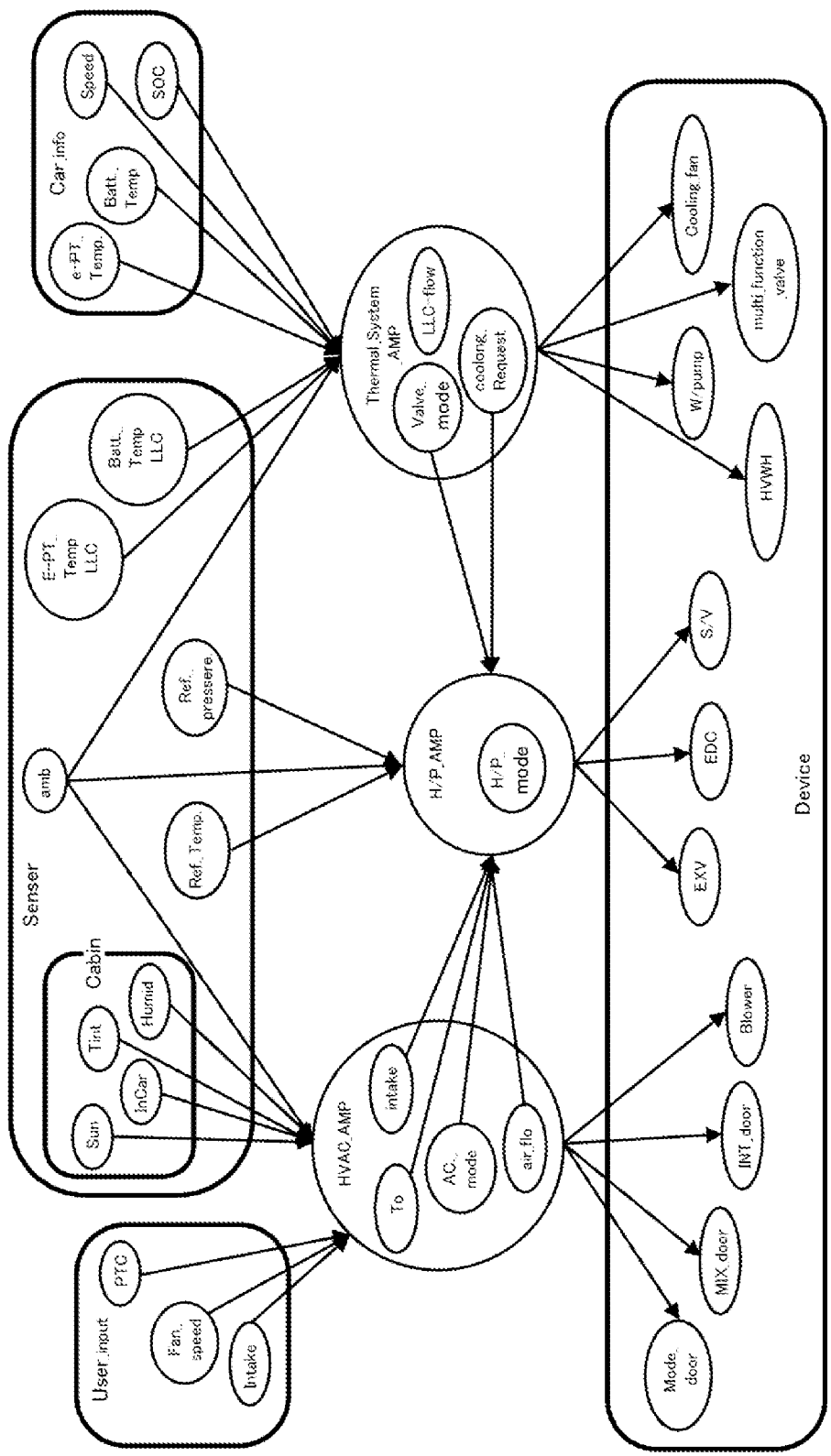
FIG. 2 is a control block diagram of the temperature control system.

Next, control of the temperature control system 100 will be described with reference to FIG. 2. FIG. 2 is a control block diagram of the temperature control system 100.

The temperature control system 100 includes an HVAC control unit HVAC_AMP, a refrigeration cycle control unit H/P_AMP, and a cooling water control unit Thermal_System_AMP.

The HVAC control unit HVAC_AMP receives a vehicle interior target temperature PTC selected by a user, an HVAC air volume Fan_speed, and an outside air/inside air mode Intake. In addition, the HVAC control unit HVAC_AMP receives a solar radiation sensor Sun, a vehicle interior temperature Incar, a vehicle interior humidity Humid, an EVA blowout air temperature Tint, and an outside air temperature amb. The HVAC control unit HVAC_AMP controls a target blowout temperature To, an air volume air_flo, an air-conditioning operation mode A/Cmode, and an outside air/inside air mode intake. Specifically, the HVAC control unit HVAC_AMP controls operations of an HVAC blowout position switching door Mode_door, a blowout air mixing door MIX_door, an outside air/inside air circulation switching door INT_door, and a blower fan Blower.

The refrigeration cycle control unit H/P_AMP receives the outside air temperature amb, an H/P refrigerant temperature Ref._Temp., and H/P refrigerant pressure Ref._pressure. In addition, the refrigeration cycle control unit H/P_AMP receives the target blowout temperature To, the air volume air_flo, the air-conditioning operation mode A/Cmode, and the outside air/inside air mode intake from the HVAC control unit HVAC_AMP. The refrigeration cycle control unit H/P_AMP controls an operation mode H/P_mode of the refrigeration cycle. Specifically, the refrigeration cycle control unit H/P_AMP controls operations of the electric expansion valve EXV, the electric compressor EDC, and an electromagnetic valve S/V.

The outside air temperature amb, an e-PT cooling water temperature e-PT_Temp_LLC., and a storage battery cooling water temperature Batt._Temp_LLC. are input to the cooling water control unit Thermal_System_AMP. In addition, the cooling water control unit Thermal_System_AMP receives, based on vehicle information, an e-PT temperature e-PT_Temp., a storage battery temperature Batt._Temp., a vehicle speed Speed, and a state of charge SOC of the storage battery. The cooling water control unit Thermal_System_AMP controls a switching valve position Valve_mode, a cooling water flow rate LLC_flow, and a cooling request Cooling_request. Specifically, the cooling water control unit Thermal_System_AMP controls operations of the high-voltage hot water heater HVWH, a cooling water pump W/pump, a cooling water switching valve multi_function_valve, and an RAD cooling fan Cooling_fan.

Figure 4:
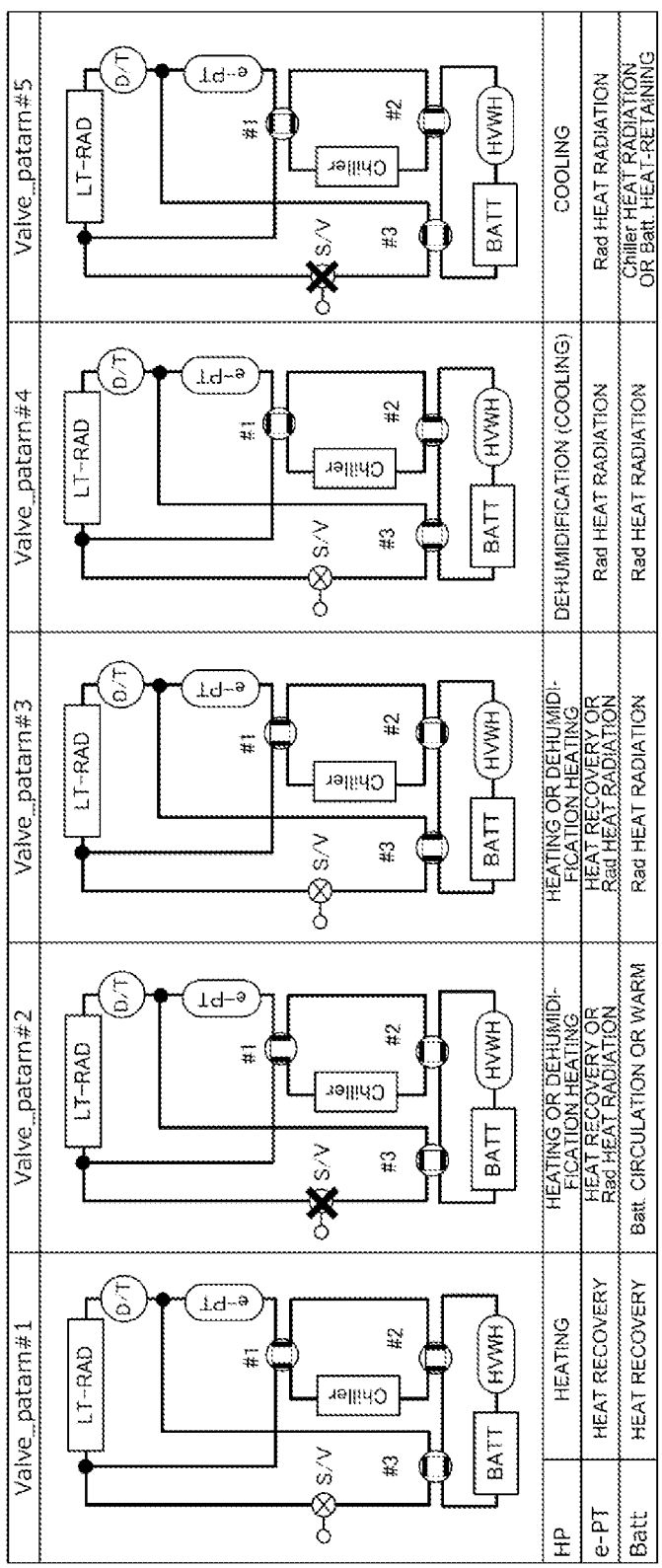
FIG. 4 is a diagram illustrating the operation modes of the cooling water circuit.

Next, switching of operation modes in the cooling water circuit 20 will be described with reference to FIGS. 3 and 4. FIG. 3 is a diagram illustrating the switching of the operation modes of the cooling water circuit 20 by valve switching. FIG. 4 is a diagram illustrating the operation modes of the cooling water circuit 20.

As shown in FIG. 3, the temperature control system 100 can be switched to five cooling water operation modes #1 to #5, and has eleven operation modes (including an H/P refrigerant recovery mode) in combination with a refrigeration cycle operation mode of the refrigeration cycle.

As shown in FIG. 4, the cooling water circuit 20 includes a first operation mode Valve_patarn #1, a second operation mode Valve_patarn #2, a third operation mode Valve_patarn #3, a fourth operation mode Valve_patarn #4, and a fifth operation mode Valve_patarn #5. As shown in FIG. 3, the operation modes are switched by the first thermal coupler 4way_valve #1, the second thermal coupler 4way_valve #2, the third thermal coupler 4way_valve #3, and the on-off valve S/V.

As shown in FIG. 3, in the first operation mode Valve_patarn #1, the first thermal coupler 4way_valve #1 is in a coupled state S (Series), the second thermal coupler 4way_valve #2 is in the coupled state S (Series), the third thermal coupler 4way_valve #3 is in a separated state P (Parallel), and the on-off valve S/V is in an open state O (Open). As shown in FIG. 4, in the first operation mode Valve_patarn #1, the refrigeration cycle circuit H/P performs a heating operation, the storage battery heat exchanger recovers heat from the storage battery Batt., and the drive system heat exchanger recovers heat from the drive system component e-PT.

As shown in FIG. 3, in the second operation mode Valve_patarn #2, the first thermal coupler 4way_valve #1 is in the coupled state S (Series), the second thermal coupler 4way_valve #2 is in the separated state P (Parallel), the third thermal coupler 4way_valve #3 is in the separated state P (Parallel), and the on-off valve S/V is in a closed state C (Close). As shown in FIG. 4, in the second operation mode Valve_patarn #2, the refrigeration cycle circuit H/P performs the heating operation or a dehumidification heating operation, the drive system heat exchanger recovers heat from the drive system component e-PT or radiates heat by the external heat exchanger LT-RAD, and the storage battery heat exchanger circulates or warms the cooling water.

As shown in FIG. 3, in the third operation mode Valve_patarn #3, the first thermal coupler 4way_valve #1 is in the coupled state S (Series), the second thermal coupler 4way_valve #2 is in the separated state P (Parallel), the third thermal coupler 4way_valve #3 is in the coupled state S (Series), and the on-off valve S/V is in the open state O (Open). As shown in FIG. 4, in the third operation mode Valve_patarn #3, the refrigeration cycle circuit H/P performs the heating operation or the dehumidification heating operation, the drive system heat exchanger recovers heat from the drive system component e-PT or radiates heat by the external heat exchanger LT-RAD, and the storage battery heat exchanger radiates heat by the external heat exchanger LT-RAD.

As shown in FIG. 3, in the fourth operation mode Valve_patarn #4, the first thermal coupler 4way_valve #1 is in the separated state P (Parallel), the second thermal coupler 4way_valve #2 is in the coupled state S (Series), the third thermal coupler 4way_valve #3 is in the coupled state S (Series), and the on-off valve S/V is in the open state O (Open). As shown in FIG. 4, in the fourth operation mode Valve_patarn #4, the refrigeration cycle circuit H/P performs a dehumidification operation (cooling operation), the drive system heat exchanger radiates heat by the external heat exchanger LT-RAD, and the storage battery heat exchanger radiates heat by the external heat exchanger LT-RAD.

As shown in FIG. 3, in the fifth operation mode Valve_patarn #5, the first thermal coupler 4way_valve #1 is in the separated state P (Parallel), the second thermal coupler 4way_valve #2 is in the coupled state S (Series), the third thermal coupler 4way_valve #3 is in the separated state P (Parallel), and the on-off valve S/V is in the closed state C (Close). As shown in FIG. 4, in the fifth operation mode Valve_patarn #5, the refrigeration cycle circuit H/P performs the cooling operation, the drive system heat exchanger radiates heat by the external heat exchanger LT-RAD, and the storage battery heat exchanger radiates heat by the cooling water-refrigerant heat exchanger Chiller or keeps the storage battery Batt. warm.

In FIG. 4, the degassing tank D/T is provided only in the second cooling water circuit 22, but instead, the degassing tank D/T may be added to a loop in which the flow of the cooling water is a closed cycle. In addition, the degassing tank D/T may be provided at a branch portion between the first cooling water circuit 21 and the bypass circuit 25.

Figure 5:
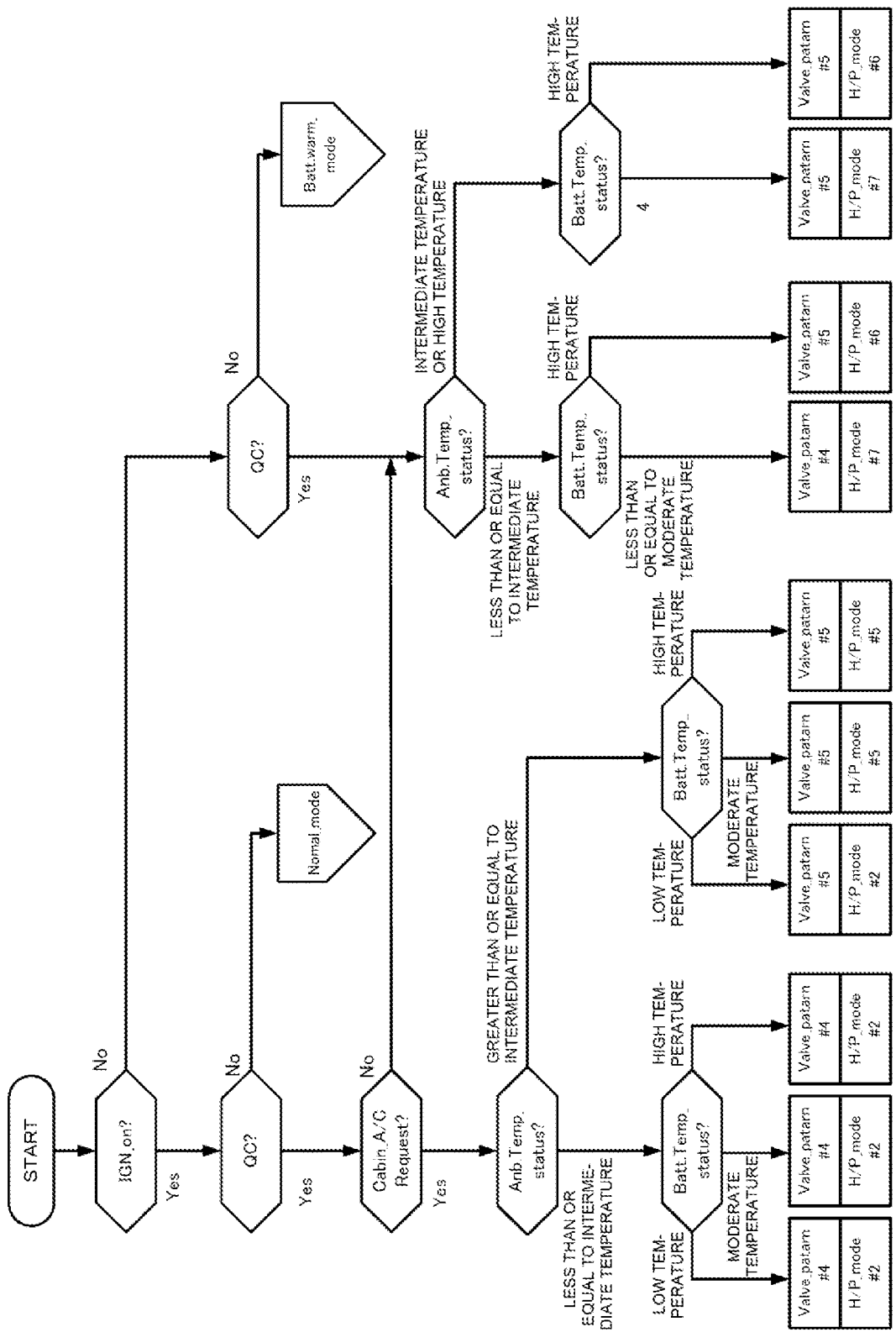
FIG. 5 is a main flowchart illustrating operation mode switching control of the cooling water circuit and a refrigeration cycle circuit.
Figure 6:
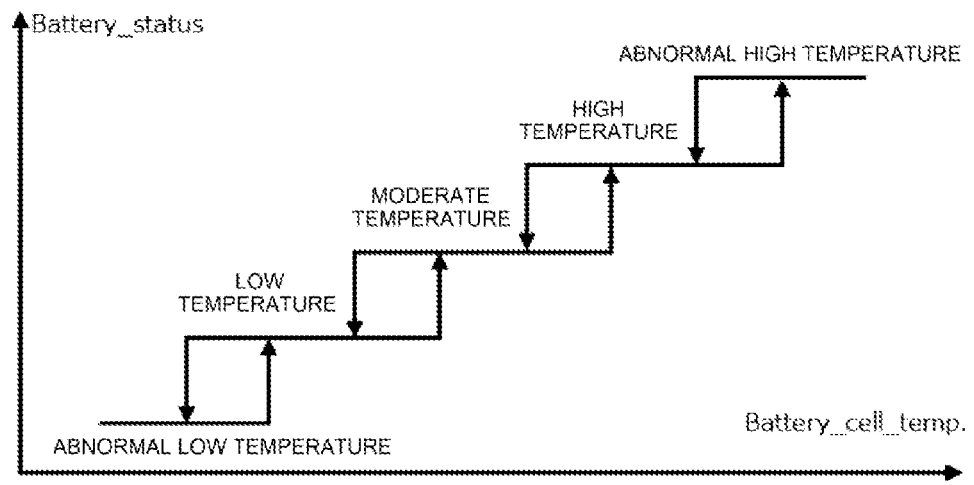
FIG. 6 is a diagram illustrating a storage battery temperature and a storage battery status during quick charge.
Figure 7:
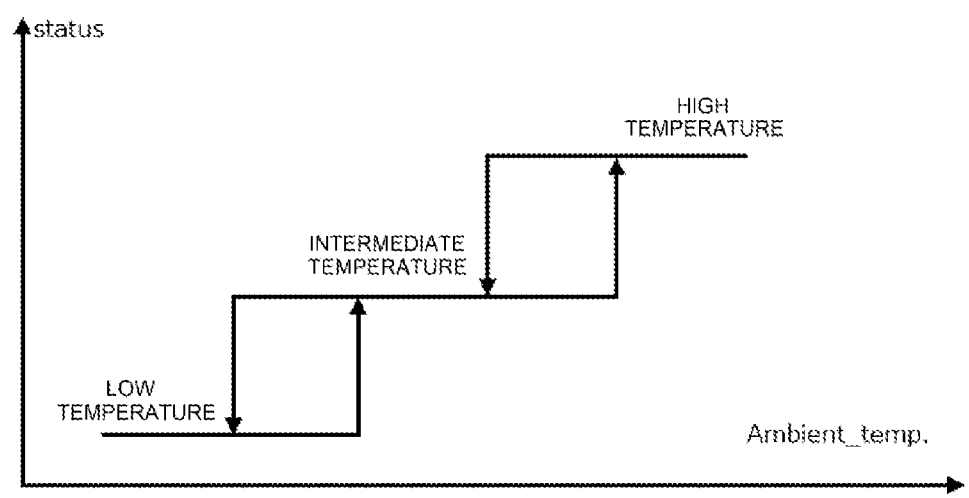
FIG. 7 is a diagram illustrating an outside air temperature and the storage battery status during the quick charge.
Figure 8:
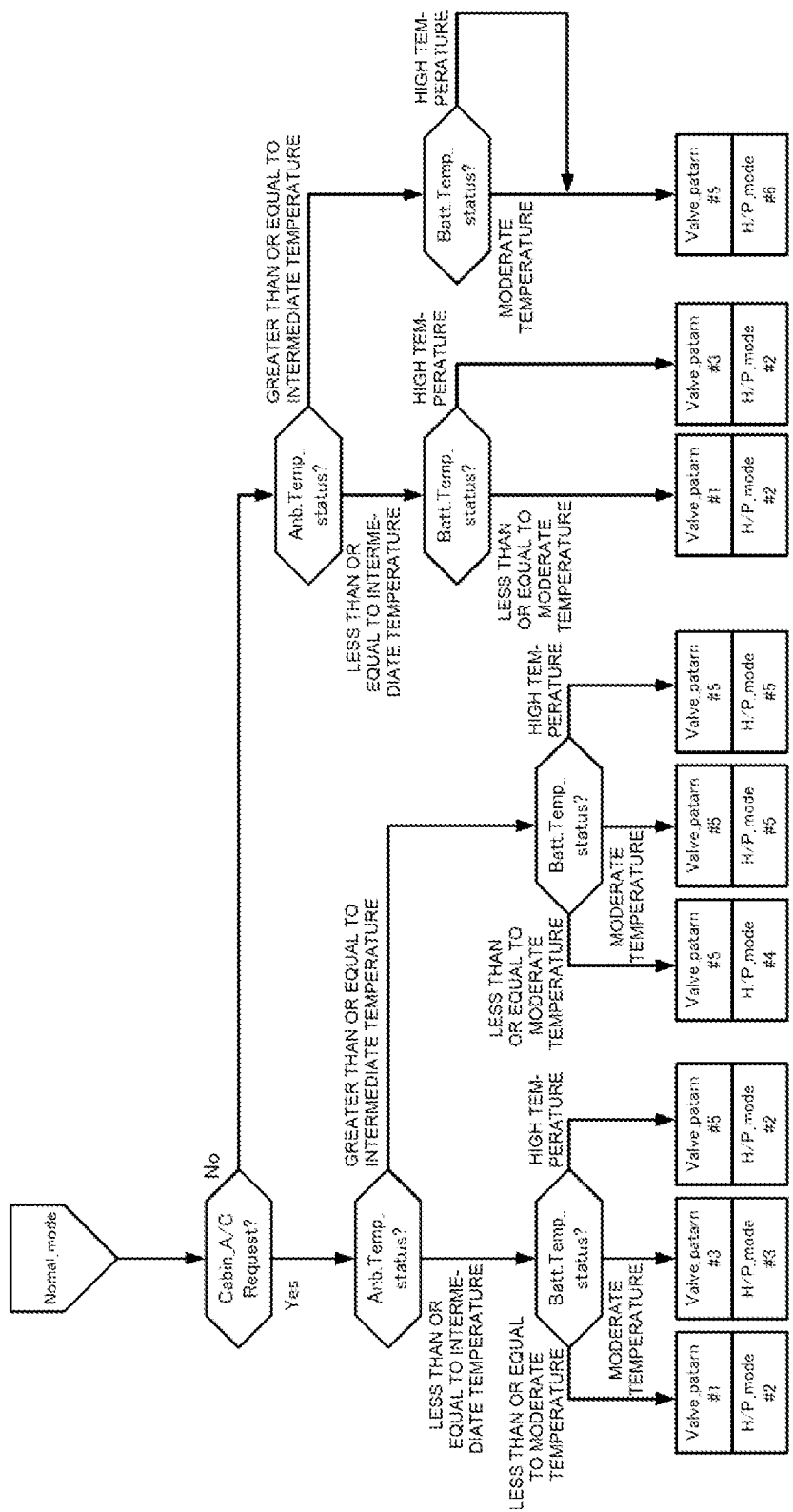
FIG. 8 is a flowchart illustrating the operation mode switching control of the cooling water circuit and the refrigeration cycle circuit in a normal traveling mode.
Figure 9:
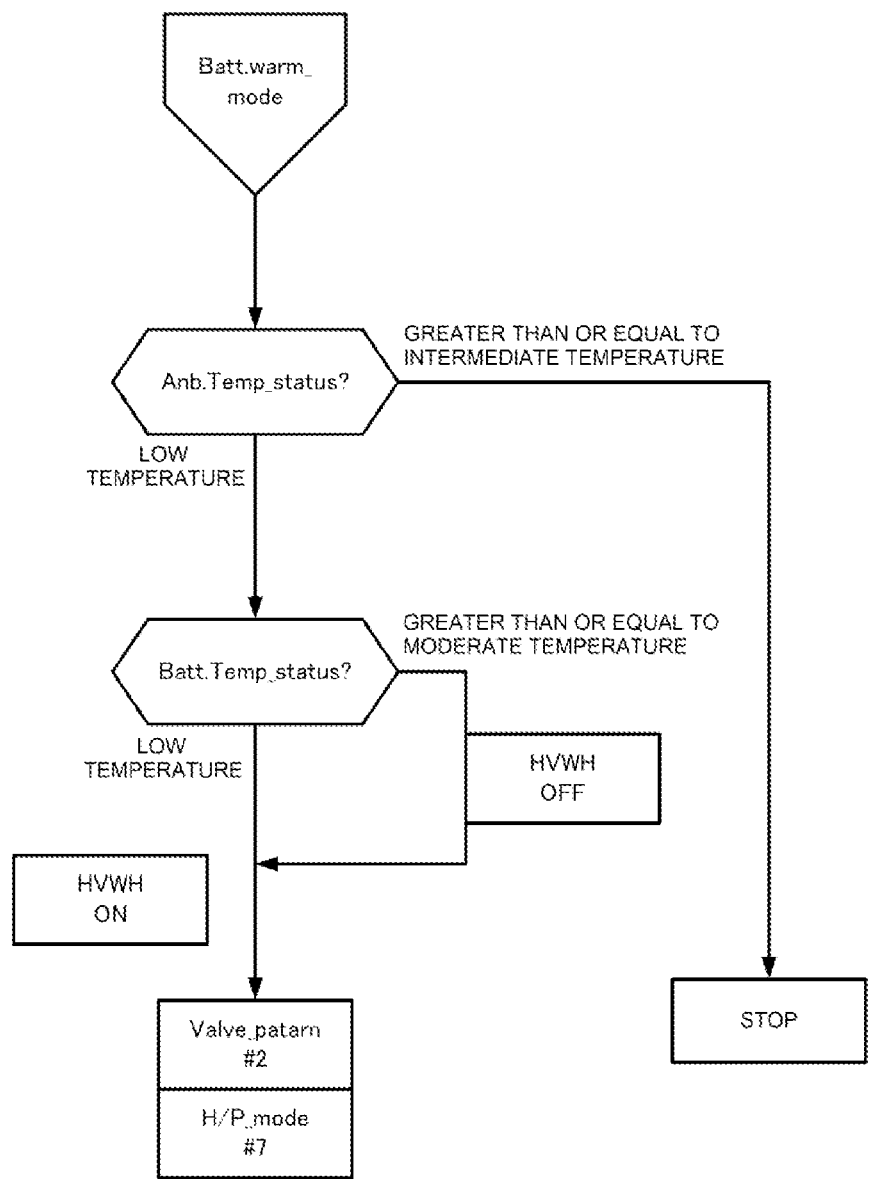
FIG. 9 is a flowchart illustrating the operation mode switching control of the cooling water circuit and the refrigeration cycle circuit in a storage battery warm mode.
Figure 10:
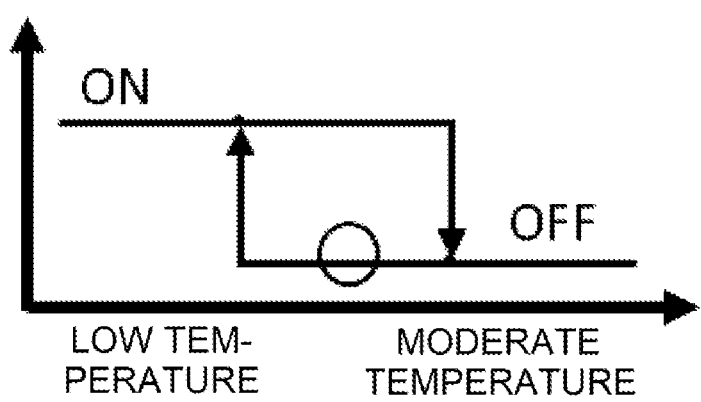
FIG. 10 is a diagram illustrating switching of a high-voltage hot water heater.

Next, switching of the operation modes of the cooling water circuit 20 and the refrigeration cycle circuit H/P by the controller will be described with reference to FIGS. 5 to 10. FIG. 5 is a main flowchart illustrating operation mode switching control of the cooling water circuit 20 and the refrigeration cycle circuit H/P. FIG. 6 is a diagram illustrating a storage battery temperature (Batt._cell_Temp) and a storage battery status (Battery_status) during quick charge (QC). FIG. 7 is a diagram illustrating an outside air temperature and the storage battery status (Battery_status) during the quick charge (QC). FIG. 8 is a flowchart illustrating the operation mode switching control of the cooling water circuit 20 and the refrigeration cycle circuit H/P in a normal traveling mode. FIG. 9 is a flowchart illustrating the operation mode switching control of the cooling water circuit 20 and the refrigeration cycle circuit H/P in a storage battery warm mode. FIG. 10 is a diagram illustrating switching of the high-voltage hot water heater HVWH.

As shown in FIG. 5, the controller determines whether ignition is on (IGN_on?), and determines whether the quick charge QC is performed (QC?). When the ignition is on and the quick charge QC is not performed, the normal traveling mode (Normal_mode) is set, and the process proceeds to the flow of FIG. 8. When the ignition is off and the quick charge QC is not performed, the storage battery warm mode (Batt._warm_mode) is set, and the process proceeds to the flow of FIG. 9.

In the main flow of FIG. 5, the controller determines whether the outside air temperature (Anb.Temp_status) is less than an intermediate temperature, greater than or equal to the intermediate temperature, or reaches a high temperature during the quick charge QC. Further, the controller switches an operation mode (Valve_Patarn) of the cooling water circuit 20 and an operation mode (H/P_mode) of the refrigeration cycle circuit H/P depending on whether the temperature of the storage battery Batt. is low, moderate, or high. The switching of the operation modes are executed as shown in FIGS. 6 and 7.

As shown in FIG. 8, in the normal traveling mode (Normal_mode), the controller determines whether there is a request for air conditioning in the vehicle interior. Thereafter, as in the main flow of FIG. 5, the operation mode (Valve_Patarn) of the cooling water circuit 20 and the operation mode (H/P_mode) of the refrigeration cycle circuit H/P are switched based on the temperature of the storage battery Batt. and the outside air temperature (Anb.Temp_status).

When there is a request for air conditioning in the vehicle interior and the outside air temperature is extremely low, the cooling water circuit 20 is switched to the first operation mode (Valve_Patarn #1). As a result, heating of the vehicle interior is performed using waste heat and heat from the high-voltage hot water heater HVWH, and air conditioning and the temperature of the storage battery Batt. are maintained at the moderate temperature by the output of the high-voltage hot water heater HVWH.

When the outside air temperature is low and the temperature of the storage battery Batt. is lower than the moderate temperature, the cooling water circuit 20 is switched to the third operation mode (Valve_Patarn #3) in which the storage battery Batt. can be warmed. As a result, the temperature of the storage battery Batt. is maintained at the moderate temperature by the output of the high-voltage hot water heater HVWH, and the heating in the vehicle interior is performed by waste heat of the drive system components e-PT and heat absorbed from the external heat exchanger LT-RAD.

When the outside air temperature is low and the temperature of the storage battery Batt. is high, the cooling water circuit 20 is switched to the fifth operation mode (Valve_Patarn #5) in which heat is absorbed from the cooling water-refrigerant heat exchanger Chiller of the refrigeration cycle circuit H/P. As a result, the refrigeration cycle circuit H/P uses waste heat of the storage battery Batt. to perform the heating operation.

When the outside air temperature is greater than or equal to a normal temperature, regardless of the temperature of the storage battery Batt., the cooling water circuit 20 is switched to the fifth operation mode (Valve_Patarn #5). As a result, the refrigeration cycle circuit H/P cools the storage battery Batt. by turning on/off refrigerant circulation to the cooling water-refrigerant heat exchanger Chiller, which performs the cooling operation.

When there is no request for air conditioning in the vehicle interior and the outside air temperature is low, the cooling water circuit 20 is switched to the same mode as when there is a request for air conditioning. When there is no request for air conditioning in the vehicle interior and the outside air temperature is greater than or equal to the normal temperature, the refrigeration cycle circuit H/P is switched to an operation mode in which the refrigerant is circulated only through the cooling water-refrigerant heat exchanger Chiller.

As shown in FIG. 9, in the storage battery warm mode (Batt._warm_mode), similarly to the main flow of FIG. 5, the controller switches the operation mode (Valve_Patarn) of the cooling water circuit 20 and the operation mode (H/P_mode) of the refrigeration cycle circuit H/P based on the temperature of the storage battery Batt. and the outside air temperature (Anb.Temp_status). In the storage battery warm mode (Batt._warm_mode), when the temperature of the storage battery Batt. is low, the high-voltage hot water heater HVWH is turned on, and when the temperature of the storage battery Batt. is greater than or equal to the moderate temperature, the high-voltage hot water heater HVWH is turned off. The on/off switching of the high-voltage hot water heater HVWH is executed as shown in FIG. 10.

The storage battery warm mode (Batt._warm_mode) is switched when the vehicle is in a stopped state and the temperature of the storage battery Batt. is low. Specifically, when the vehicle is in the stopped state and the temperature of the storage battery Batt. is low, the cooling water circuit 20 is switched to the second operation mode (Valve_Patarn #2), the operation of the refrigeration cycle circuit H/P is stopped, and the temperature of the storage battery Batt. is maintained at the moderate temperature by switching on/off of the high-voltage hot water heater HVWH.

Figure 11:
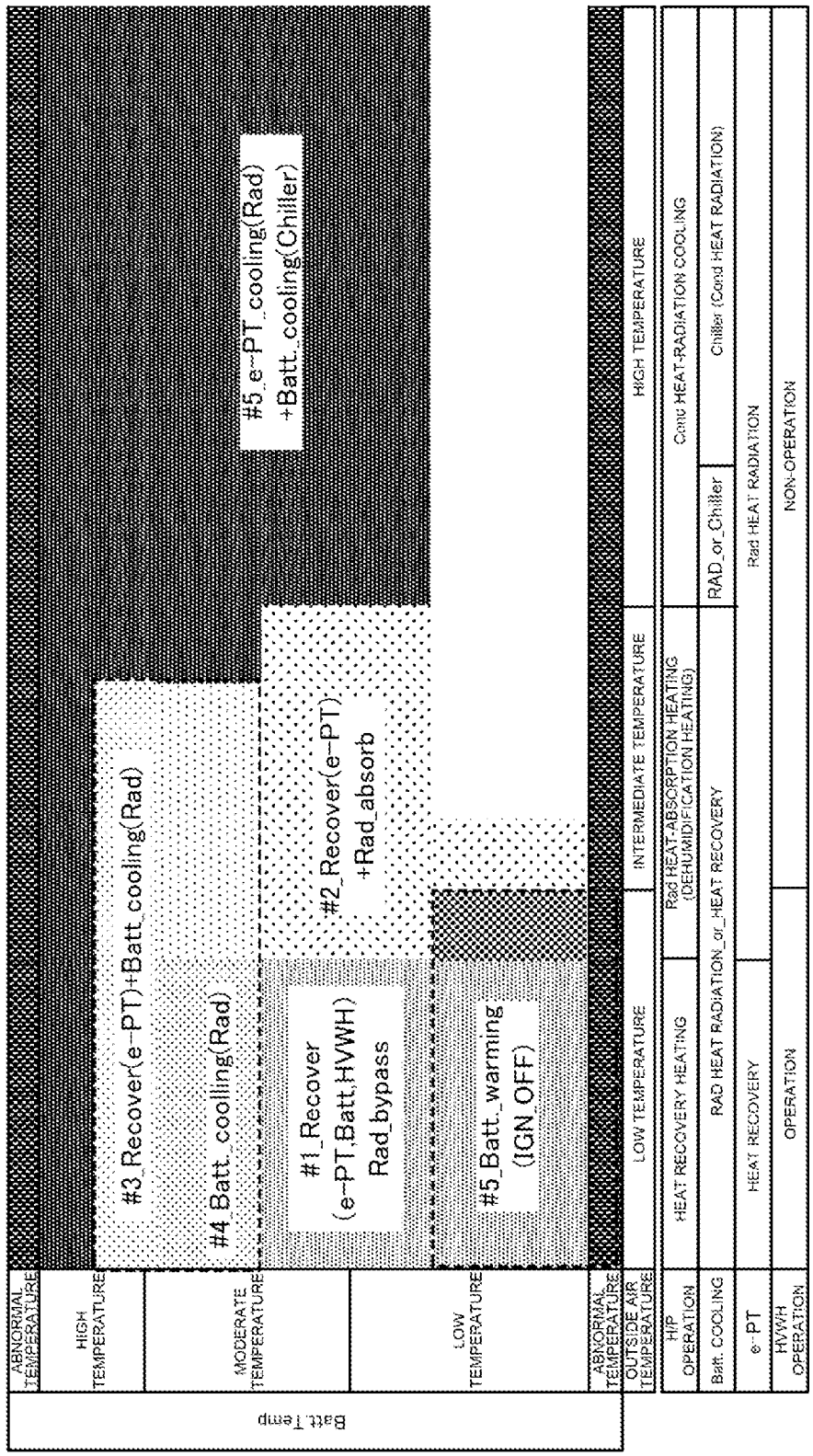
FIG. 11 is a transition diagram illustrating switching of the cooling water circuit according to the outside air temperature and the storage battery temperature.
Figure 12:
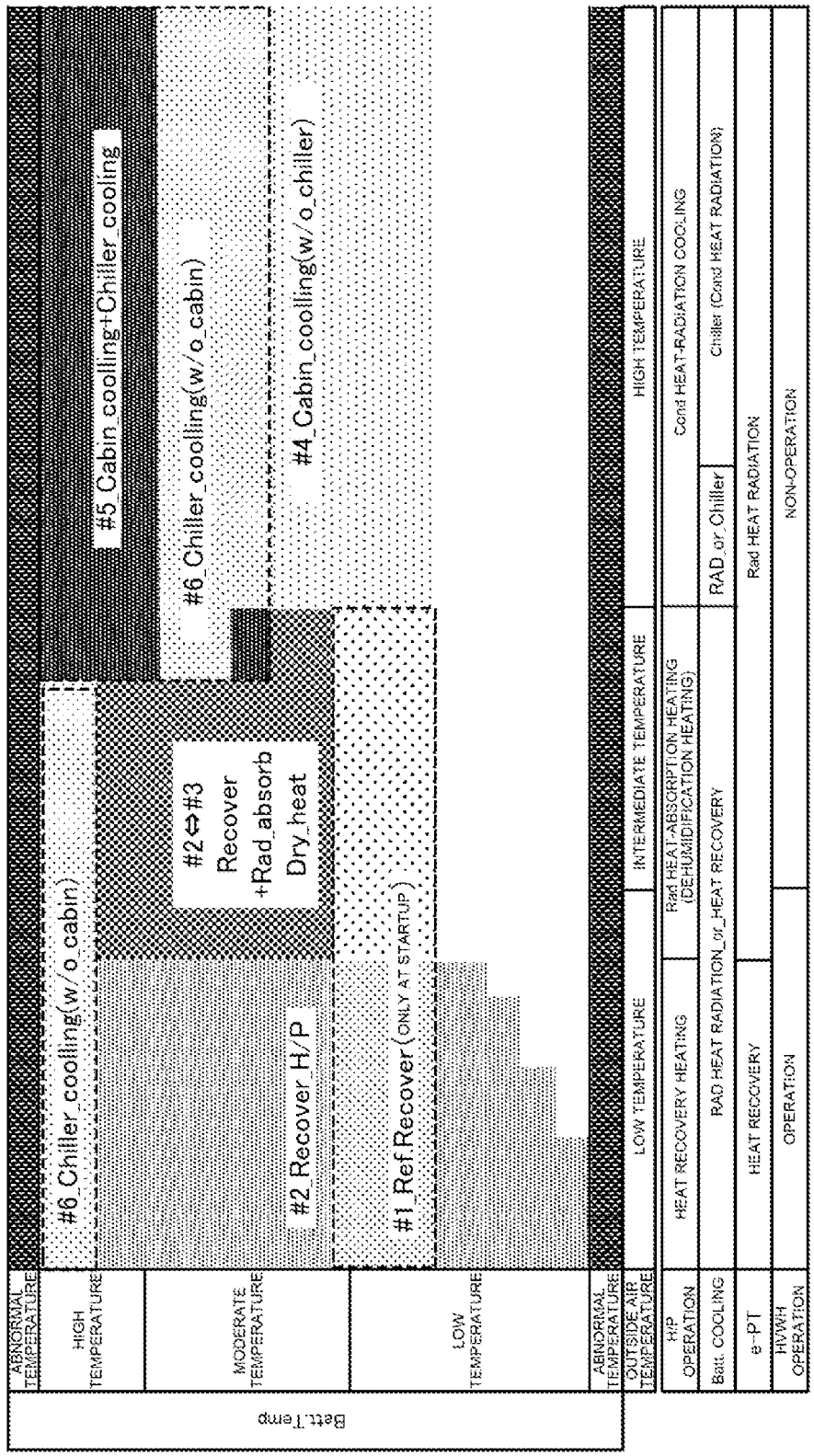
FIG. 12 is a transition diagram illustrating switching of the refrigeration cycle circuit according to the outside air temperature and the storage battery temperature.

Next, transition of the operation modes will be described with reference to FIGS. 11 and 12. FIG. 11 is a transition diagram illustrating the switching of the cooling water circuit 20 according to the outside air temperature and the storage battery temperature. FIG. 12 is a transition diagram illustrating the switching of the refrigeration cycle circuit H/P according to the outside air temperature and the storage battery temperature.

As shown in FIG. 11, the operation mode of the cooling water circuit 20 is switched based on the outside air temperature and a storage battery temperature Batt.Temp. Specifically, the outside air temperature is divided into a low temperature, an intermediate temperature, and a high temperature, and the storage battery temperature Batt.Temp is divided into a low temperature, a moderate temperature, a high temperature, and an abnormal temperature.

When the outside air temperature is low, the refrigeration cycle circuit H/P performs a heat recovery heating operation, the storage battery Batt. radiates heat by the external heat exchanger LT-RAD or waste heat thereof is recovered by the external heat exchanger LT-RAD, waste heat of the drive system component e-PT is recovered, and the high-voltage hot water heater HVWH is brought into an operation state.

At this time, in a region where the storage battery temperature Batt.Temp is low, an operation according to the fifth operation mode Valve_patarn #5 is performed (#5_Batt._warming). In a region where the storage battery temperature Batt.Temp ranges from a higher low temperature to the moderate temperature, an operation according to the first operation mode Valve_patarn #1 is performed (#1_Recover). In a region where the storage battery temperature Batt.Temp is a higher moderate temperature, an operation according to the fourth operation mode Valve_Patarn #4 is performed (#4_QC(Quick Charge)_Batt._cooling). In a region where the storage battery temperature Batt.Temp ranges from a higher moderate temperature to the high temperature, an operation according to the third operation mode Valve_Patarn #3 is performed (#3_Recover(e-PT)+Batt_cooling(Rad)).

When the outside air temperature is the intermediate temperature (a part in a region from the low temperature to the intermediate temperature), the refrigeration cycle circuit H/P performs a heating operation of absorbing heat in the outdoor heat exchanger COND (dehumidification heating), the storage battery Batt. radiates heat by the external heat exchanger LT-RAD or waste heat thereof is recovered by the external heat exchanger LT-RAD, the drive system component e-PT radiates heat by the external heat exchanger LT-RAD, and the high-voltage hot water heater HVWH is brought into a non-operation state.

At this time, in a region where the storage battery temperature Batt.Temp ranges from the low temperature to the high temperature, an operation according to the second operation mode Valve_Patarn #2 is performed (#2_Recover(e-PT)+Batt_absorb).

When the outside air temperature is high (when the storage battery temperature Batt. is the moderate temperature (a part in a region from the intermediate temperature to the high temperature), and when the storage battery temperature Batt. is high (a part in a region from the low temperature to the high temperature)), the refrigeration cycle circuit H/P performs a cooling operation of radiating heat by the outdoor heat exchanger COND. When the storage battery Batt. is at a relatively low temperature, the storage battery Batt. radiates heat by the external heat exchanger LT-RAD or the cooling water-refrigerant heat exchanger Chiller. When the storage battery Batt. is at a relatively high temperature, the storage battery Batt. radiates heat by the cooling water-refrigerant heat exchanger Chiller, the drive system component e-PT radiates heat by the external heat exchanger LT-RAD, and the high-voltage hot water heater HVWH is brought into the non-operation state.

At this time, in all regions where the storage battery temperature Batt.Temp ranges from the low temperature to the high temperature, the operation according to the fifth operation mode Valve_Patarn #5 is performed (#5_e-PT_cooling(Rad)+Batt._cooling (Chiller)).

As shown in FIG. 12, the operation mode of the refrigeration cycle circuit H/P is switched based on the storage battery temperature Batt.Temp and the outside air temperature. Specifically, the outside air temperature is divided into the low temperature, the intermediate temperature, and the high temperature, and the storage battery temperature Batt.Temp is divided into the low temperature, the moderate temperature, the high temperature, and the abnormal temperature.

The first operation mode (#1_Ref.Recover) is an operation mode in which the refrigerant accumulated in the outdoor heat exchanger COND is recovered at the start of the heating operation. The second operation mode (#2_Recover_H/P) is a mode in which the heating operation is performed by absorbing waste heat of the drive system component e-PT, waste heat of the storage battery Batt., and heat from the high-voltage hot water heater HVWH via the cooling water-refrigerant heat exchanger Chiller. The third operation mode (#3_Recover+Rad_absorb_Dry_heat) is a mode in which the dehumidification heating operation is performed by absorbing heat in the external heat exchanger LT-RAD via the cooling water-refrigerant heat exchanger Chiller and the cooling water circuit 20. The fourth operation mode (#4_Cabin_cooling(w/o_Chiller)) is a normal cooling operation mode in which the refrigerant does not circulate through the cooling water-refrigerant heat exchanger Chiller. The fifth operation mode (#5_Cabin_cooling+Chiller_cooling) is a mode in which the cooling operation in the vehicle interior and the operation of circulating the refrigerant through the cooling water-refrigerant heat exchanger Chiller to cool the storage battery Batt. are simultaneously performed. A sixth operation mode (#6_Chiller_cooling(w/o_cabin)) is a mode in which the refrigerant is not circulated through the evaporator EVA but is circulated only through the cooling water-refrigerant heat exchanger Chiller to cool the storage battery Batt. A seventh operation mode (System_OFF) is a mode in which the operation of the refrigeration cycle circuit H/P is stopped.

When the outside air temperature is low, in a region where the storage battery temperature Batt.Temp ranges from the low temperature to the high temperature, the operation according to the second operation mode is performed (#2_Recover_H/P), and in a region where the storage battery temperature Batt.Temp is a high temperature that is even higher, an operation according to the sixth operation mode (#6_Chiller_cooling(w/o_cabin)) is performed. Only at the startup, in a region where the storage battery temperature Batt.Temp ranges from the low temperature to the moderate temperature, the operation according to the first operation mode is performed (#1_Ref.Recover).

When the outside air temperature is the intermediate temperature (a part in a region from the low temperature to the intermediate temperature), in a region where the storage battery temperature Batt.Temp ranges from the low temperature to the high temperature, an operation of alternately switching the second operation mode and the third operation mode is performed (#3_Recover+Rad_absorb_Dry_heat), and in a region where the storage battery temperature Batt.Temp is a high temperature that is even higher, the operation according to the sixth operation mode is performed (#6_Chiller_cooling(w/o_cabin)).

When the outside air temperature is high (when the storage battery temperature Batt. is the moderate temperature (a part in a region from the intermediate temperature to the high temperature), and when the storage battery temperature Batt. is high (a part in a region from the low temperature to the high temperature)), in a region where the storage battery temperature Batt.Temp ranges from the low temperature to the moderate temperature, the operation according to the fourth operation mode is performed (#4_Cabin_cooling(w/o_Chiller)), in a region where the storage battery temperature Batt.Temp is moderate, the operation according to the sixth operation mode is performed (#6_Chiller_cooling(w/o_cabin)), and in a region where the storage battery temperature Batt.Temp is high, the operation according to the fifth operation mode is performed (#5_Cabin_cooling+Chiller_cooling).

Figure 13:
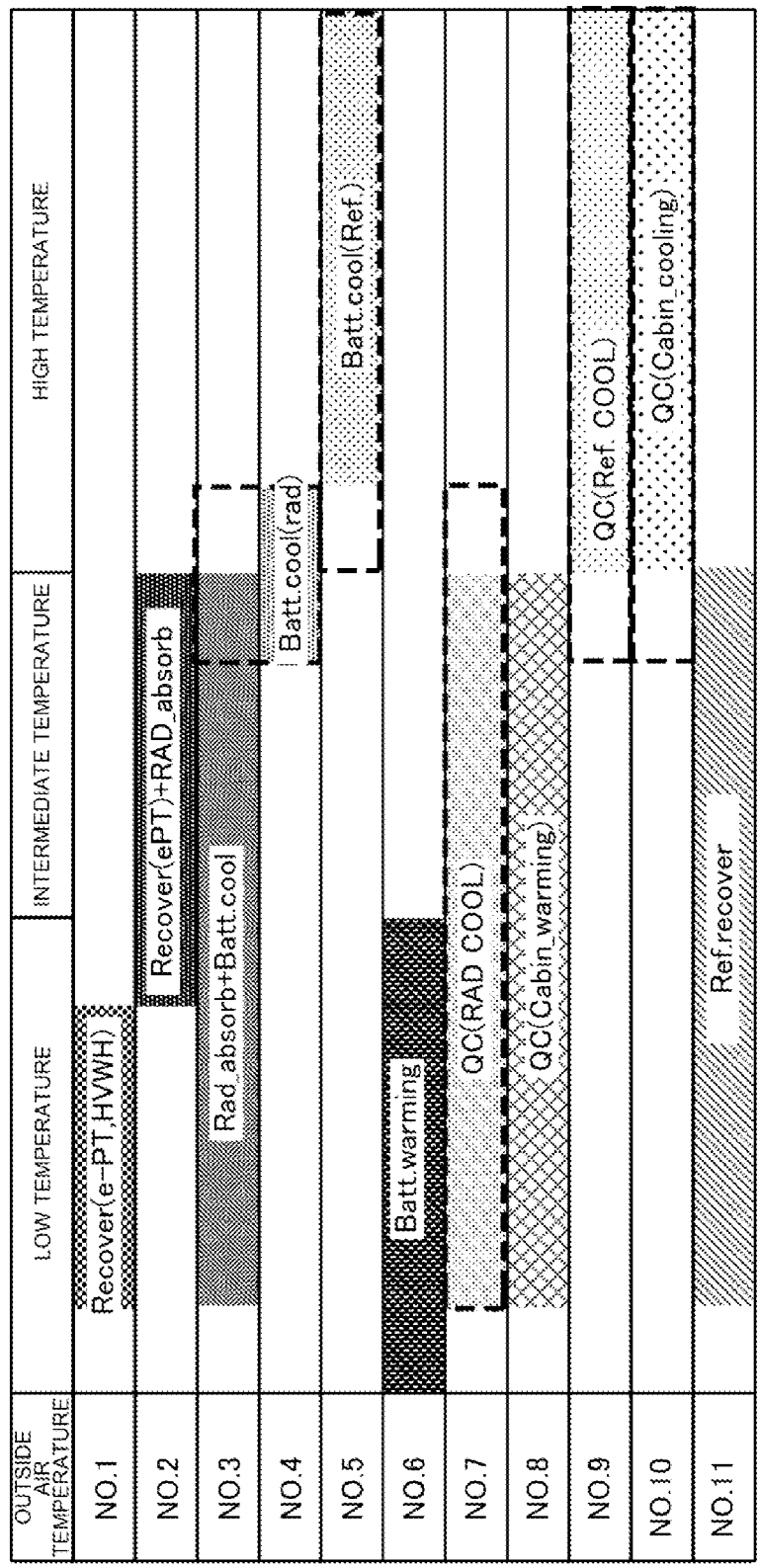
FIG. 13 is a diagram illustrating switching of operation modes of the temperature control system with respect to the outside air temperature.

Next, operation modes of the temperature control system 100 will be described with reference to FIGS. 13 and 14. FIG. 13 is a diagram illustrating switching of the operation modes of the temperature control system 100 with respect to the outside air temperature. FIG. 14 is a diagram illustrating the operation modes of the temperature control system 100.

As shown in FIG. 13, a first operation mode No. 1 (Recover(e-PT,HVWH)) is switched in the region where the outside air temperature is low. A second operation mode No. 2 (Recover(e-PT)+RAD_absorb) is switched in the region where the outside air temperature ranges from the low temperature to the intermediate temperature. A third operation mode No. 3 (Rad_absorb+Batt.cool) is switched in the region where the outside air temperature ranges from the low temperature to the intermediate temperature. A fourth operation mode No. 4 (Batt.cool(rad)) is switched in the region where the outside air temperature ranges from the intermediate temperature to the high temperature. A fifth operation mode No. 5 (Batt.cool(Ref.)) is switched in the region where the outside air temperature is high. A sixth operation mode No. 6 (Batt._warming) is switched in the region where the outside air temperature is low. A seventh operation mode No. 7 (QC(RAD_COOL)) is switched in the region where the outside air temperature ranges from the low temperature to the intermediate temperature. An eighth operation mode No. 8 (QC(Cabin_warming)) is switched in the region where the outside air temperature ranges from the low temperature to the intermediate temperature. A ninth operation mode No. 9 (QC(Ref._COOL)) is switched in the region where the outside air temperature is high. A tenth operation mode No. 10 (QC(Cabin_cooling)) is switched in the region where the outside air temperature is high, and an eleventh operation mode No. 11 is switched in the region where the outside air temperature ranges from the low temperature to the intermediate temperature.

As shown in FIG. 14, in the first operation mode No. 1, the drive system component e-PT is in a heat recovery mode, the storage battery Batt. is in the heat recovery mode, an air conditioning mode (H/P mode) is a heating mode, the first thermal coupler 4way_valve #1 is in the coupled state S (Series), the second thermal coupler 4way_valve #2 is in the coupled state S (Series), the third thermal coupler 4way_valve #3 is in the separated state P (Parallel), the on-off valve S/V is in the open state O (Open), and the high-voltage hot water heater HVWH is turned on.

In addition, in all the operation modes, a cooling fan C/fan is subjected to map control based on the external heat exchanger LT-RAD, a discharge pressure Pd of the electric compressor EDC in the refrigeration cycle circuit H/P, and a vehicle speed.

In the second operation mode No. 2, the drive system component e-PT is in the heat recovery mode, the storage battery Batt. is in a circulation mode, the air conditioning mode (H/P mode) is a dehumidification heating mode, the first thermal coupler 4way_valve #1 is in the coupled state S (Series), the second thermal coupler 4way_valve #2 is in the separated state P (Parallel), the third thermal coupler 4way_valve #3 is in the separated state P (Parallel), the on-off valve S/V is in the closed state C (Close), and the high-voltage hot water heater HVWH is turned off.

In the third operation mode No. 3, the drive system component e-PT is in the heat recovery mode, the storage battery Batt. is in a Rad heat radiation mode, the air conditioning mode (H/P mode) is the dehumidification heating mode, the first thermal coupler 4way_valve #1 is in the coupled state S (Series), the second thermal coupler 4way_valve #2 is in the separated state P (Parallel), the third thermal coupler 4way_valve #3 is in the coupled state S (Series), the on-off valve S/V is in the open state O (Open), and the high-voltage hot water heater HVWH is turned off.

In the first operation mode No. 1, the second operation mode No. 2, and the third operation mode No. 3, a heat pump heating operation is performed using waste heat of the drive system component e-PT. In the first operation mode No. 1, heating by the high-voltage hot water heater HVWH is used together.

In the fourth operation mode No. 4, the drive system component e-PT is in the Rad heat radiation mode, the storage battery Batt. is in the Rad heat radiation mode, the air conditioning mode (H/P mode) is a dehumidification (cooling) mode, the first thermal coupler 4way_valve #1 is in the separated state P (Parallel), the second thermal coupler 4way_valve #2 is in the coupled state S (Series), the third thermal coupler 4way_valve #3 is in the coupled state S (Series), the on-off valve S/V is in the open state O (Open), and the high-voltage hot water heater HVWH is turned off.

In the fifth operation mode No. 5, the drive system component e-PT is in the Rad heat radiation mode, the storage battery Batt. is in a Chiller heat radiation mode, the air conditioning mode (H/P mode) is a cooling mode, the first thermal coupler 4way_valve #1 is in the separated state P (Parallel), the second thermal coupler 4way_valve #2 is in the coupled state S (Series), the third thermal coupler 4way_valve #3 is in the separated state P (Parallel), the on-off valve S/V is in the closed state C (Close), and the high-voltage hot water heater HVWH is turned off.

In the fourth operation mode No. 4 and the fifth operation mode No. 5, the storage battery Batt. is cooled without using the refrigeration cycle circuit H/P.

In the sixth operation mode No. 6, the storage battery Batt. is in a heat-retaining mode, the first thermal coupler 4way_valve #1 is in the separated state P (Parallel), the second thermal coupler 4way_valve #2 is in the coupled state S (Series), the third thermal coupler 4way_valve #3 is in the separated state P (Parallel), the on-off valve S/V is in the closed state C (Close), and the high-voltage hot water heater HVWH is turned on.

In the sixth operation mode No. 6, the storage battery Batt. is kept warm by the operation of the high-voltage hot water heater HVWH.

In the seventh operation mode No. 7, the drive system component e-PT is in the Rad heat radiation mode, the storage battery Batt. is in the Rad heat radiation mode, the first thermal coupler 4way_valve #1 is in the separated state P (Parallel), the second thermal coupler 4way_valve #2 is in the coupled state S (Series), the third thermal coupler 4way_valve #3 is in the coupled state S (Series), the on-off valve S/V is in the open state O (Open), and the high-voltage hot water heater HVWH is turned off.

In the eighth operation mode No. 8, the drive system component e-PT is in the Rad heat radiation mode, the storage battery Batt. is in the Rad heat radiation mode, the air conditioning mode (H/P mode) is the heating mode, the first thermal coupler 4way_valve #1 is in the separated state P (Parallel), the second thermal coupler 4way_valve #2 is in the coupled state S (Series), the third thermal coupler 4way_valve #3 is in the coupled state S (Series), the on-off valve S/V is in the open state O (Open), and the high-voltage hot water heater HVWH is turned off.

In the ninth operation mode No. 9, the drive system component e-PT is in the Rad heat radiation mode, the storage battery Batt. is in the Chiller heat radiation mode, the first thermal coupler 4way_valve #1 is in the separated state P (Parallel), the second thermal coupler 4way_valve #2 is in the coupled state S (Series), the third thermal coupler 4way_valve #3 is in the separated state P (Parallel), the on-off valve S/V is in the closed state C (Close), and the high-voltage hot water heater HVWH is turned off.

In the seventh operation mode No. 7 and the ninth operation mode No. 9, the refrigeration cycle circuit H/P operates in response to requests from the storage battery Batt. and an interior Cabin.

In the tenth operation mode No. 10, the drive system component e-PT is in the Rad heat radiation mode, the storage battery Batt. is in the Chiller heat radiation mode, the air conditioning mode (H/P mode) is the cooling mode, the first thermal coupler 4way_valve #1 is in the separated state P (Parallel), the second thermal coupler 4way_valve #2 is in the coupled state S (Series), the third thermal coupler 4way_valve #3 is in the separated state P (Parallel), the on-off valve S/V is in the closed state C (Close), and the high-voltage hot water heater HVWH is turned off.

The eleventh operation mode No. 11 is a mode for recovering the refrigerant accumulated in the outdoor heat exchanger COND at the start of the heating operation, and is a necessary mode in the refrigeration cycle circuit H/P of the present embodiment, but may not be necessary depending on the configuration of the refrigeration cycle circuit.

Next, operations of the devices of the refrigeration cycle circuit H/P according to the outside air temperature will be described with reference to FIGS. 15 and 16. FIG. 15 is a diagram illustrating the operations of the devices of the refrigeration cycle circuit H/P with respect to the outside air temperature. FIG. 16 is a diagram illustrating the operations of the devices of the refrigeration cycle circuit H/P in each operation mode of the air conditioner 110.

As shown in FIG. 15, the outside air/inside air mode Intake is an outside air introduction mode in a region where the outside air temperature is relatively low (the region from the low temperature to the intermediate temperature), and is an inside air circulation mode in a region where the outside air temperature is relatively high (the region from the low temperature to the high temperature).

In the refrigeration cycle circuit H/P, the heating operation is performed in the region where the outside air temperature is relatively low (the region from the low temperature to the intermediate temperature), the dehumidification heating operation is performed in the region where the outside air temperature is intermediate (the region from the low temperature to the high temperature), and the cooling operation is performed in the region where the outside air temperature is relatively high (the high temperature region). In the refrigeration cycle circuit H/P, in a region where the outside air temperature is intermediate (a narrow region from the intermediate temperature to the high temperature), the dehumidification operation (cooling operation) is performed. At this time, the outside air/inside air mode Intake allows switching between the dehumidification heating operation and the dehumidification operation (cooling operation).

The electric compressor EDC is controlled based on the discharge pressure Pd in the region where the outside air temperature is relatively low (the region from the low temperature to the high temperature), and is controlled based on the blowout air temperature Tint of the evaporator EVA in the region where the outside air temperature is relatively high (the region from the intermediate temperature to the high temperature).

The electric expansion valve EXV (eva) is controlled (int_controle(min_opening)) based on the blowout air temperature Tint of the evaporator EVA in the region where the outside air temperature is relatively low (the region from the low temperature to the intermediate temperature), and is controlled (Sub-cool_controle) based on an outlet refrigerant supercooling degree of the outdoor heat exchanger COND in the region where the outside air temperature is relatively high (the region from the intermediate temperature to the high temperature).

The electric expansion valve EXV (Chiller) is controlled (Sub-cool_controle) based on the outlet refrigerant supercooling degree of the outdoor heat exchanger COND in the region where the outside air temperature is low, and is controlled (Tw_Batt.) based on an inlet cooling water temperature of the storage battery heat exchanger in the region where the outside air temperature is relatively high (the region from the low temperature to the high temperature).

The shut valve S/V (COND) is in the closed state (Close) in a temperature region where the outside air temperature is relatively low (the region from the low temperature to the high temperature), and is in the open state (Open) in a temperature region where the outside air temperature is relatively high (the region from the intermediate temperature to the high temperature).

The shut valve S/V (Chiller) is in the open state (Open) in a temperature region where the outside air temperature is relatively low (the region from the low temperature to the high temperature), and is in the closed state (Close) in a temperature region where the outside air temperature is relatively high (the region from the intermediate temperature to the high temperature).

As shown in FIG. 16, in the control of the electric compressor EDC, a rotation speed is varied such that the discharge pressure Pd is a predetermined value during the heating operation and the blowout air temperature Tint of the evaporator EVA is a predetermined value during the cooling operation.

The electric expansion valve EXV (eva) is in the closed state (Close) during the heating operation, and is controlled to be opened and closed by the blowout air temperature Tint of the evaporator EVA with a fixed opening degree during the dehumidification heating operation. During the cooling operation, the electric expansion valve EXV (eva) is controlled based on the outside air temperature, the vehicle interior temperature, the HVAC air volume, and the like, or is controlled based on the outlet refrigerant supercooling degree of the outdoor heat exchanger COND.

The electric expansion valve EXV (Chiller) is controlled based on the inlet cooling water temperature of the storage battery heat exchanger or based on an outlet refrigerant supercooling degree of the heater core I/COND during the heating operation and the dehumidification heating operation. The electric expansion valve EXV (Chiller) is subjected to map control based on the cooling water temperature of the storage battery heat exchanger during the cooling operation and storage battery Batt. cooling.

The shut valve S/V (COND) is in the open state (Open) during the cooling operation, and is in the closed state (Close) during the heating operation. The shut valve S/V (Chiller) is in the closed state (Close) during the cooling operation, and is in the open state (Open) during the heating operation. The shut valve S/V (COND) and the shut valve S/V (Chiller) are both in the closed state (Close) only during a refrigerant recovery operation (the eleventh operation mode No. 11) at the start of the heating operation.

According to the above embodiment, the following effects are achieved.

The temperature control system 100 for a vehicle includes the refrigeration cycle circuit H/P configured to allow a refrigerant to circulate therethrough and the cooling water circuit 20 configured to allow cooling water to circulate therethrough. The refrigeration cycle circuit H/P includes the electric compressor EDC configured to compress the refrigerant, the heater core I/COND configured to heat air used for air conditioning using heat of the refrigerant compressed by the electric compressor EDC, and the cooling water-refrigerant heat exchanger Chiller configured to exchange heat between the refrigerant and the cooling water in the cooling water circuit 20. The cooling water circuit 20 includes the first cooling water circuit 21 including the cooling water-refrigerant heat exchanger Chiller, a storage battery heat exchanger configured to exchange heat with the storage battery Batt., and the first pump W/P (Batt.) configured to suction and discharge the cooling water, and configured to allow the cooling water to circulate therethrough, the second cooling water circuit 22 including the external heat exchanger LT-RAD configured to exchange heat between the cooling water and outside air, a drive system heat exchanger configured to exchange heat with the drive system component e-PT that drives the vehicle, and the second pump W/P (e-PT) configured to suction and discharge the cooling water, and configured to allow the cooling water to circulate therethrough, the first thermal coupler 4way_valve #1 configured to switch the cooling water circulating through the first cooling water circuit 21 and the cooling water circulating through the second cooling water circuit 22 between thermal coupling and separation, and the bypass circuit 25 including the on-off valve S/V capable of blocking a flow of the cooling water, connected to upstream and downstream of the external heat exchanger LT-RAD, and provided in parallel with the first cooling water circuit 21.

The cooling water that radiates heat by the external heat exchanger LT-RAD branches and flows into the storage battery heat exchanger of the first cooling water circuit 21 and the drive system heat exchanger of the second cooling water circuit 22.

In the cooling water circuit 20, the cooling water is circulatable in an order of the drive system heat exchanger, the storage battery heat exchanger, and the cooling water-refrigerant heat exchanger Chiller.

The first cooling water circuit 21 includes the third cooling water circuit 23 including the cooling water-refrigerant heat exchanger Chiller and configured to allow the cooling water to circulate therethrough, the fourth cooling water circuit 24 including the first pump W/P (Batt.) and the storage battery heat exchanger and configured to allow the cooling water to circulate therethrough, the second thermal coupler 4way_valve #2 configured to switch the cooling water circulating through the third cooling water circuit 23 and the cooling water circulating through the fourth cooling water circuit 24 between thermal coupling and separation, and the third thermal coupler 4way_valve #3 configured to switch the cooling water circulating through the fourth cooling water circuit 24 and the cooling water circulating through the bypass circuit 25 between thermal coupling and separation. The first thermal coupler 4way_valve #1 is capable of switching the second cooling water circuit 22 and the third cooling water circuit 23 between coupling and separation, and the cooling water that radiates heat by the external heat exchanger LT-RAD branches and flows into the drive system heat exchanger of the second cooling water circuit 22 and the storage battery heat exchanger of the fourth cooling water circuit 24.

The first cooling water circuit 21 includes the third cooling water circuit 23 including the cooling water-refrigerant heat exchanger Chiller and configured to allow the cooling water to circulate therethrough, the fourth cooling water circuit 24 including the first pump W/P (Batt.) and the storage battery heat exchanger and configured to allow the cooling water to circulate therethrough, the second thermal coupler 4way_valve #2 configured to switch the cooling water circulating through the third cooling water circuit 23 and the cooling water circulating through the fourth cooling water circuit 24 between thermal coupling and separation, and the third thermal coupler 4way_valve #3 configured to switch the cooling water circulating through the fourth cooling water circuit 24 and the cooling water circulating through the bypass circuit 25 between thermal coupling and separation. When the first thermal coupler 4way_valve #1 couples the second cooling water circuit 22 and the third cooling water circuit 23, the second thermal coupler 4way_valve #2 couples the third cooling water circuit 23 and the fourth cooling water circuit 24, and the third thermal coupler 4way_valve #3 separates the fourth cooling water circuit 24 from the bypass circuit 25, the cooling water is circulatable in an order of the drive system heat exchanger, the storage battery heat exchanger, and the cooling water-refrigerant heat exchanger Chiller.

The third thermal coupler 4way_valve #3 and the on-off valve S/V are disposed in series in a flow path of the bypass circuit 25.

The first thermal coupler 4way_valve #1 and the second thermal coupler 4way_valve #2 are disposed in series in a flow path of the third cooling water circuit 23.

The bypass circuit 25 is switchable between a bypass flow state in which a flow of the cooling water to the external heat exchanger LT-RAD in the second cooling water circuit 22 is bypassed and a parallel connection flow state in which the storage battery heat exchanger and the drive system heat exchanger are connected in parallel.

According to these configurations, it is possible to provide the temperature control system 100 that combines the refrigeration cycle circuit H/P and the cooling water circuit 20 and is capable of performing various types of control such as air conditioning, storage battery temperature control, and waste heat utilization with a simple configuration.

Although the embodiment of the present invention has been described in the above, the above-mentioned embodiment merely illustrates a part of application examples of the present invention, and the technical scope of the present invention is not intended to be limited to the specific configurations of the above-described embodiment.

For example, in the above embodiment, the temperature control system 100 includes the cooling water circuit 20 shown in FIG. 1 as a cooling water circuit. However, the configuration of the cooling water circuit of the temperature control system 100 is not limited thereto. For example, the temperature control system 100 may include a cooling water circuit 30 shown in FIG. 17. In this case, the same effect as in the case where the temperature control system 100 includes the cooling water circuit 20 is also achieved.

Figure 17:
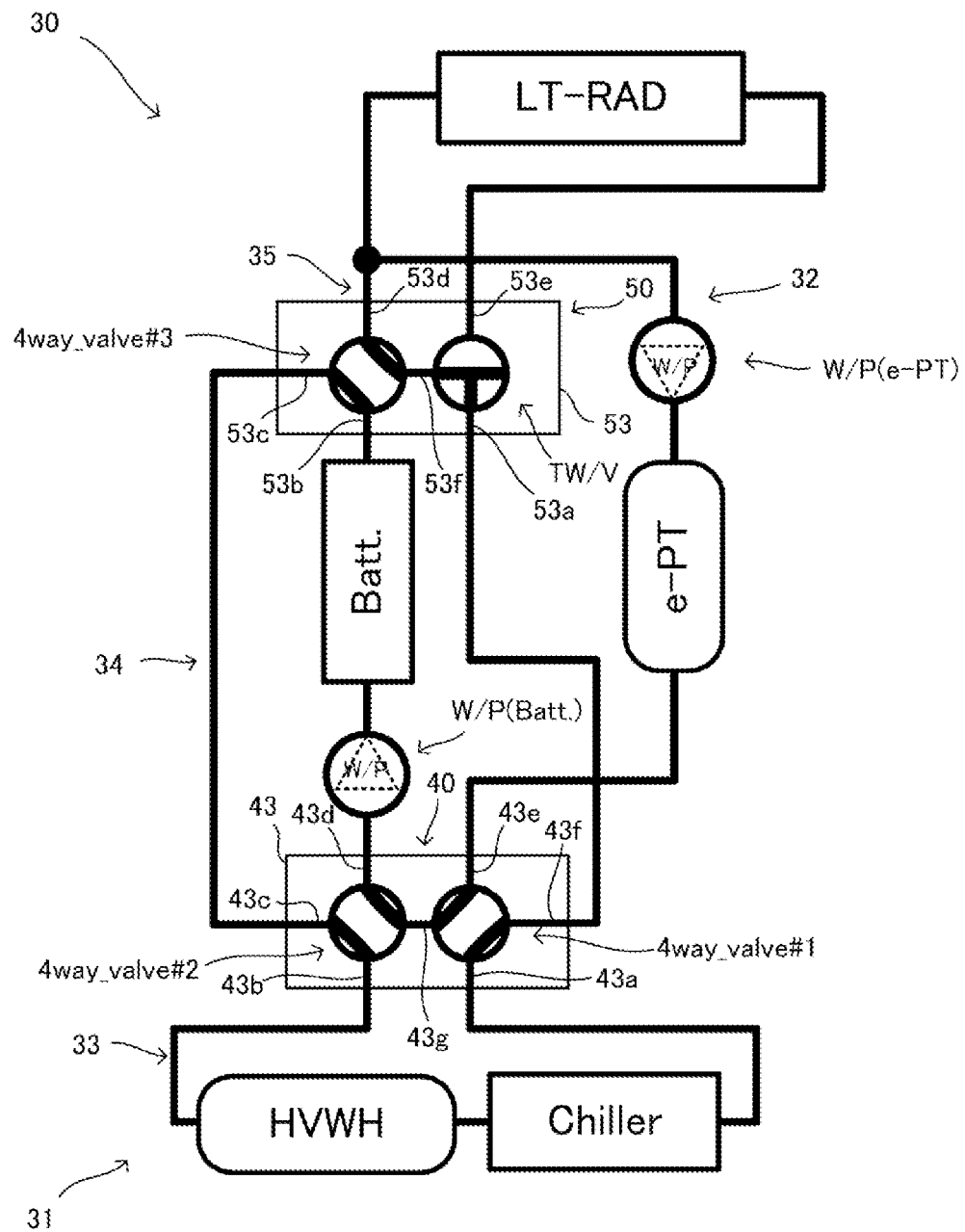
FIG. 17 is a configuration diagram of a cooling water circuit according to a modification of the embodiment of the present invention.
Figure 18:
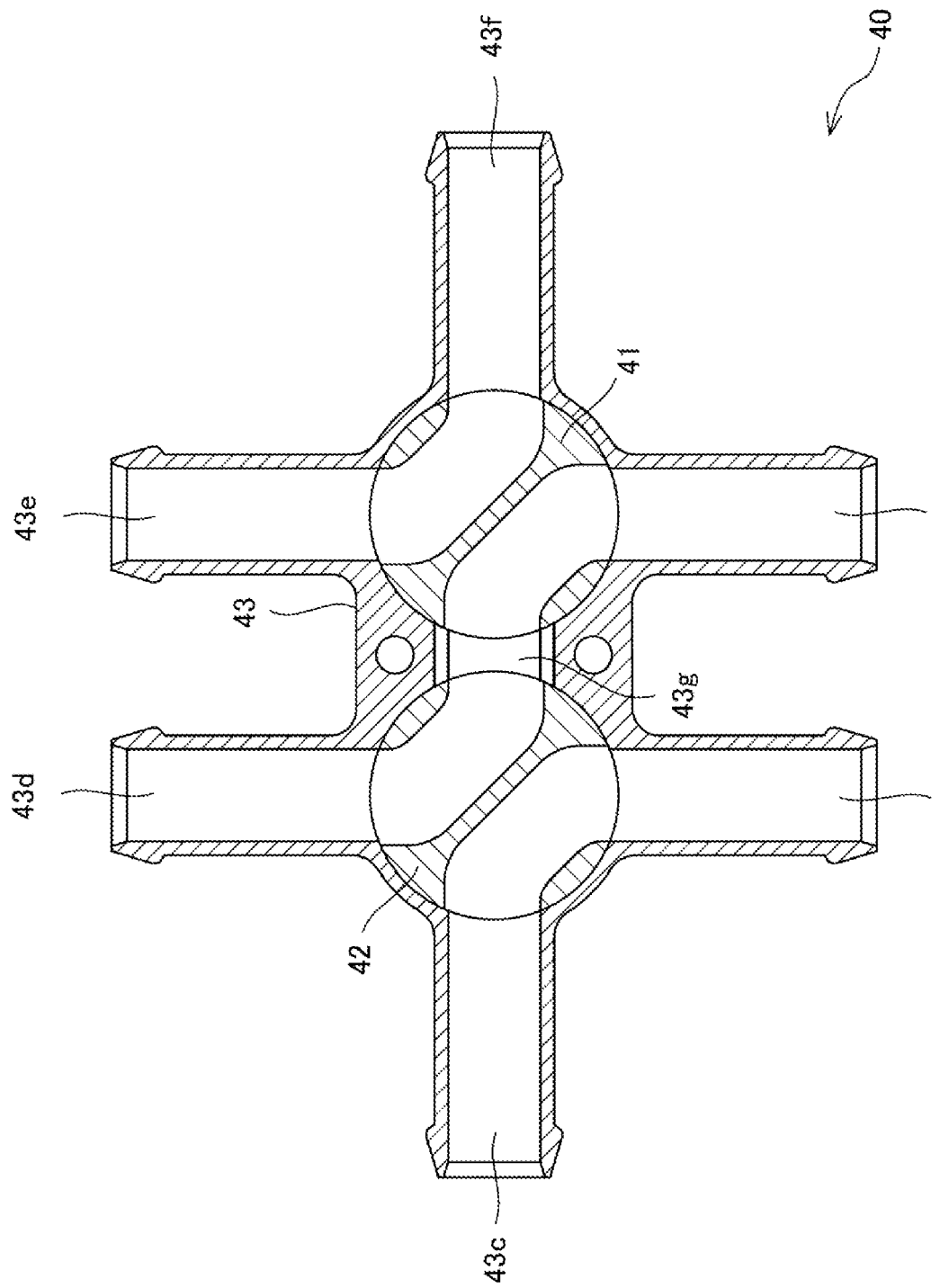
FIG. 18 is a configuration diagram of an integrated valve included in the cooling water circuit according to the modification of the embodiment of the present invention.

Hereinafter, the cooling water circuit 30 will be described with reference to FIGS. 17 to 19 as a modification of the cooling water circuit. FIG. 17 is a configuration diagram of the cooling water circuit 30. FIG. 18 is a configuration diagram of an integrated valve 40 included in the cooling water circuit 30. FIG. 19 is a diagram illustrating operation modes of the cooling water circuit 30.

As shown in FIG. 17, the cooling water circuit 30 includes a first cooling water circuit 31, a second cooling water circuit 32, a bypass circuit 35, a first thermal coupler 4way_valve #1, a second thermal coupler 4way_valve #2, and a third thermal coupler 4way_valve #3. The first cooling water circuit 31 includes a third cooling water circuit 33, a fourth cooling water circuit 34, and the second thermal coupler 4way_valve #2.

The first cooling water circuit 31 includes a cooling water-refrigerant heat exchanger Chiller, a first pump W/P (Batt.), a high-voltage hot water heater HVWH, a storage battery heat exchanger that exchanges heat with a storage battery Batt., and the second thermal coupler 4way_valve #2. The first cooling water circuit 31 can be switched between thermal coupling and separation with the second cooling water circuit 32 by the first thermal coupler 4way_valve #1. The first cooling water circuit 31 can be switched between thermal coupling and separation with the bypass circuit 35 by the third thermal coupler 4way_valve #3.

The second cooling water circuit 32 includes an external heat exchanger LT-RAD that exchanges heat between cooling water and outside air, a second pump W/P (e-PT), and a drive system heat exchanger that exchanges heat with a drive system component e-PT. The second cooling water circuit 32 can be switched between thermal coupling and separation with the first cooling water circuit 31 by the first thermal coupler 4way_valve #1. A plurality of second pumps W/P (e-PT) and a plurality of drive system heat exchangers may be provided.

The third cooling water circuit 33 includes the cooling water-refrigerant heat exchanger Chiller and the high-voltage hot water heater HVWH. The high-voltage hot water heater HVWH is provided on an upstream side of the cooling water-refrigerant heat exchanger Chiller in a direction in which the cooling water flows. The third cooling water circuit 33 can be switched between thermal coupling and separation with the second cooling water circuit 22 by the first thermal coupler 4way_valve #1. The third cooling water circuit 33 can be switched between thermal coupling and separation with the fourth cooling water circuit 34 by the second thermal coupler 4way_valve #2.

The fourth cooling water circuit 34 includes the storage battery heat exchanger that exchanges heat with the storage battery Batt., and the first pump W/P (Batt.). The fourth cooling water circuit 34 can be switched between thermal coupling and separation with the third cooling water circuit 33 by the second thermal coupler 4way_valve #2. The fourth cooling water circuit 34 can be switched between thermal coupling and separation with the bypass circuit 35 by the third thermal coupler 4way_valve #3.

The bypass circuit 35 includes a three-way valve TW/V as an on-off valve capable of switching between the presence or absence of a flow to the external heat exchanger LT-RAD and the presence or absence of a flow to the bypass circuit 35. The bypass circuit 35 is connected to the upstream and downstream of the external heat exchanger LT-RAD and is provided in parallel with the first cooling water circuit 31. The bypass circuit 35 can be switched between thermal coupling and separation with the fourth cooling water circuit 34 (first cooling water circuit 31) by the third thermal coupler 4way_valve #3.

As shown in FIG. 17, in the cooling water circuit 30, the first thermal coupler 4way_valve #1 and the second thermal coupler 4way_valve #2 are disposed close to each other. Therefore, the first thermal coupler 4way_valve #1 and the second thermal coupler 4way_valve #2 can be constituted as the integrated valve 40. Accordingly, the cooling water circuit 30 can be made more compact compared to a case where the first thermal coupler 4way_valve #1 and the second thermal coupler 4way_valve #2 are separately provided. Similarly, the third thermal coupler 4way_valve #3 and the three-way valve TW/V can be constituted as an integrated valve 50.

As shown in FIG. 18, the integrated valve 40 is a rotary valve including valve bodies 41 and 42 and a housing 43 that rotatably accommodates the valve bodies 41 and 42. The valve body 41 and the housing 43 constitute the first thermal coupler 4way_valve #1. The valve body 42 and the housing 43 constitute the second thermal coupler 4way_valve #2.

As shown in FIGS. 17 and 18, the housing 43 has flow paths 43a to 43g. As shown in FIG. 17, the flow path 43a and the flow path 43b are connected to the third cooling water circuit 33. The flow path 43c and the flow path 43d are connected to the fourth cooling water circuit 34. The flow path 43e and the flow path 43f are connected to the second cooling water circuit 32. The flow path 43g connects the first thermal coupler 4way_valve #1 and the second thermal coupler 4way_valve #2.

The integrated valve 50 can be implemented by configuring one of the two valves 4way_valve of the integrated valve 40 as 3way_valve. As shown in FIG. 17, a housing 53 of the integrated valve 50 has flow paths 53a to 53f. The flow path 53a and the flow path 53e are connected to the second cooling water circuit 32. The flow path 53b and the flow path 53c are connected to the fourth cooling water circuit 34. The flow path 53d is connected to the bypass circuit 35. The flow path 53f connects the third thermal coupler 4way_valve #3 and the three-way valve TW/V. The flow path 53f constitutes a part of the bypass circuit 35.

As described above, the cooling water circuit 30 includes the integrated valve 40 in which the first thermal coupler 4way_valve #1, the second thermal coupler 4way_valve #2, and the flow path 43g connecting the first thermal coupler 4way_valve #1 and the second thermal coupler 4way_valve #2 are provided in the housing 43. Thus, the cooling water circuit 30 is compact.

The cooling water circuit 30 includes the integrated valve 50 in which the third thermal coupler 4way_valve #3, the three-way valve TW/V, and the flow path 53f connecting the third thermal coupler 4way_valve #3 and the three-way valve TW/V are provided in the housing 53. Thus, the cooling water circuit 30 is compact.

Next, the operation modes of the cooling water circuit 30 will be described with reference to FIG. 19.

As shown in FIG. 19, the cooling water circuit 30 includes a first operation mode Valve_patarn #1, a second operation mode Valve_patarn #2, a third operation mode Valve_patarn #3, a fourth operation mode Valve_patarn #4, a fifth operation mode Valve_patarn #5, and a sixth operation mode Valve_patarn #6. The operation modes are switched by the first thermal coupler 4way_valve #1, the second thermal coupler 4way_valve #2, the third thermal coupler 4way_valve #3, and the three-way valve TW/V.

The first operation mode Valve_patarn #1 of the cooling water circuit 30 is an operation mode corresponding to the first operation mode Valve_patarn #1 of the cooling water circuit 20.

In the first operation mode Valve_patarn #1, the first thermal coupler 4way_valve #1 is in a coupled state S (Series), the second thermal coupler 4way_valve #2 is in the coupled state S (Series), the third thermal coupler 4way_valve #3 is in a separated state P (Parallel), and the three-way valve TW/V is in a state of blocking the flow to the external heat exchanger LT-RAD and allowing the flow to the bypass circuit 35.

That is, in the first operation mode Valve_patarn #1, when the first thermal coupler 4way_valve #1 couples the second cooling water circuit 32 and the third cooling water circuit 33, the second thermal coupler 4way_valve #2 couples the third cooling water circuit 33 and the fourth cooling water circuit 34, the third thermal coupler 4way_valve #3 separates the fourth cooling water circuit 34 from the bypass circuit 35, and the three-way valve TW/V blocks the flow of the cooling water to the external heat exchanger LT-RAD and allows the flow of the cooling water to the bypass circuit 35, the cooling water can circulate in an order of the drive system heat exchanger, the storage battery heat exchanger, the cooling water-refrigerant heat exchanger Chiller, and the bypass circuit 35.

As shown in FIG. 19, in the first operation mode Valve_patarn #1, the refrigeration cycle circuit H/P performs a heating operation, the storage battery heat exchanger recovers heat from the storage battery Batt., and the drive system heat exchanger recovers heat from the drive system component e-PT. The output of the high-voltage hot water heater HVWH maintains air conditioning and a temperature of the storage battery Batt. at a moderate temperature (BATT warm heat recovery).

The second operation mode Valve_patarn #2 of the cooling water circuit 30 is different from the fifth operation mode Valve_patarn #5 of the cooling water circuit 20 in that the three-way valve TW/V blocks the flow to the external heat exchanger LT-RAD and allows the flow to the bypass circuit 35.

In the second operation mode Valve_patarn #2, the first thermal coupler 4way_valve #1 is in the separated state P (Parallel), the second thermal coupler 4way_valve #2 is in the coupled state S (Series), the third thermal coupler 4way_valve #3 is in the separated state P (Parallel), and the three-way valve TW/V is in a state of blocking the flow to the external heat exchanger LT-RAD and allowing the flow to the bypass circuit 35.

That is, in the second operation mode Valve_patarn #2, when the first thermal coupler 4way_valve #1 separates the second cooling water circuit 32 from the third cooling water circuit 33, the second thermal coupler 4way_valve #2 couples the third cooling water circuit 33 and the fourth cooling water circuit 34, the third thermal coupler 4way_valve #3 separates the fourth cooling water circuit 34 from the bypass circuit 35, and the three-way valve TW/V blocks the flow of the cooling water to the external heat exchanger LT-RAD and allows the flow of the cooling water to the bypass circuit 35, the first cooling water circuit 31 and the second cooling water circuit 32 are separated, the cooling water can circulate through the storage battery heat exchanger and the cooling water-refrigerant heat exchanger Chiller independently from the second cooling water circuit 32, and the cooling water can circulate through the drive system heat exchanger and the bypass circuit 35 independently from the first cooling water circuit 31.

As shown in FIG. 19, in the second operation mode Valve_patarn #2, the refrigeration cycle circuit H/P performs the heating operation or a dehumidification heating operation, the storage battery heat exchanger recovers heat from the storage battery Batt., and the drive system heat exchanger stores heat from the drive system component e-PT. The output of the high-voltage hot water heater HVWH maintains the air conditioning and the temperature of the storage battery Batt. at the moderate temperature (BATT warm).

As described above, in the cooling water circuit 30, the high-voltage hot water heater HVWH is provided on the upstream side of the cooling water-refrigerant heat exchanger Chiller in the direction in which the cooling water flows. Therefore, in the first operation mode Valve_patarn #1 and the second operation mode Valve_patarn #2, the output (heat) of the high-voltage hot water heater HVWH is preferentially used for heating. The remaining heat that is not recovered by the refrigeration cycle circuit H/P is used for warming the storage battery Batt. or maintaining the temperature thereof.

The third operation mode Valve_patarn #3 of the cooling water circuit 30 is an operation mode corresponding to the second operation mode Valve_patarn #2 of the cooling water circuit 20.

In the third operation mode Valve_patarn #3, the first thermal coupler 4way_valve #1 is in the coupled state S (Series), the second thermal coupler 4way_valve #2 is in the separated state P (Parallel), the third thermal coupler 4way_valve #3 is in the separated state P (Parallel), and the three-way valve TW/V is in a state of allowing the flow to the external heat exchanger LT-RAD and blocking the flow to the bypass circuit 35.

As shown in FIG. 19, in the third operation mode Valve_patarn #3, the refrigeration cycle circuit H/P performs the heating operation or the dehumidification heating operation, the drive system heat exchanger recovers heat from the drive system components e-PT, and the external heat exchanger LT-RAD absorbs heat according to the outside air temperature, and the storage battery heat exchanger stores heat from the storage battery Batt.

In the third operation mode Valve_patarn #3, when heat from the drive system component e-PT is not used, the drive system component e-PT radiates heat by the external heat exchanger LT-RAD, and when the heat from the drive system component e-PT is used, the heat is absorbed by the external heat exchanger LT-RAD.

The fourth operation mode Valve_patarn #4 of the cooling water circuit 30 is an operation mode corresponding to the third operation mode Valve_patarn #3 of the cooling water circuit 20.

In the fourth operation mode Valve_patarn #4, the first thermal coupler 4way_valve #1 is in the coupled state S (Series), the second thermal coupler 4way_valve #2 is in the separated state P (Parallel), the third thermal coupler 4way_valve #3 is in the coupled state S (Series), and the three-way valve TW/V is in a state of allowing the flow to the external heat exchanger LT-RAD and the flow to the bypass circuit 35.

As shown in FIG. 19, in the fourth operation mode Valve_patarn #4, the refrigeration cycle circuit H/P performs the heating operation or the dehumidification heating operation, the drive system heat exchanger radiates heat by the external heat exchangers LT-RAD and recovers heat from the drive system component e-PT according to the outside air temperature, and the storage battery heat exchanger radiates heat by the external heat exchangers LT-RAD.

The fifth operation mode Valve_patarn #5 of the cooling water circuit 30 is an operation mode corresponding to the fourth operation mode Valve_patarn #4 of the cooling water circuit 20.

In the fifth operation mode Valve_patarn #5, the first thermal coupler 4way_valve #1 is in the separated state P (Parallel), the second thermal coupler 4way_valve #2 is in the coupled state S (Series), the third thermal coupler 4way_valve #3 is in the coupled state S (Series), and the three-way valve TW/V is in a state of allowing the flow to the external heat exchanger LT-RAD and the flow to the bypass circuit 35.

As shown in FIG. 19, in the fifth operation mode Valve_patarn #5, the refrigeration cycle circuit H/P performs a dehumidification operation (cooling operation), the drive system heat exchanger radiates heat by the external heat exchanger LT-RAD, and the storage battery heat exchanger radiates heat by the external heat exchanger LT-RAD and radiates heat by the cooling water-refrigerant heat exchanger Chiller according to an air conditioning temperature.

The sixth operation mode Valve_patarn #6 of the cooling water circuit 30 is an operation mode corresponding to the fifth operation mode Valve_patarn #5 of the cooling water circuit 20.

In the sixth operation mode Valve_patarn #6, the first thermal coupler 4way_valve #1 is in the separated state P (Parallel), the second thermal coupler 4way_valve #2 is in the coupled state S (Series), the third thermal coupler 4way_valve #3 is in the separated state P (Parallel), and the three-way valve TW/V is in a state of allowing the flow to the external heat exchanger LT-RAD and blocking the flow to the bypass circuit 35.

As shown in FIG. 19, in the sixth operation mode Valve_patarn #6, the refrigeration cycle circuit H/P performs the cooling operation, the drive system heat exchanger radiates heat by the external heat exchanger LT-RAD, and the storage battery heat exchanger radiates heat by the cooling water-refrigerant heat exchanger Chiller.

In a case where the temperature control system 100 includes the cooling water circuit 30, the heat from the drive system component e-PT when the outside air temperature is low can be stored and used in the second operation mode Valve_patarn #2. When the stored heat is used in the second operation mode Valve_patarn #2, it is switched to the first operation mode Valve_patarn #1, and both the heat from the drive system component e-PT and the heat from the storage battery Batt. are recovered and used for heating. The switching from the second operation mode Valve_patarn #2 to the first operation mode Valve_patarn #1 is performed when a temperature of the cooling water in the second cooling water circuit 32 and a temperature of the cooling water in the fourth cooling water circuit 34 become substantially the same. The temperature of the cooling water for the operation mode switching is about 5° C. to 15° C.

As described above, the cooling water circuit 30 includes the first cooling water circuit 31 including the cooling water-refrigerant heat exchanger Chiller, the storage battery heat exchanger configured to exchange heat with the storage battery Batt., and the first pump W/P (Batt.) configured to suction and discharge the cooling water, and configured to allow the cooling water to circulate therethrough; the second cooling water circuit 32 including the external heat exchanger LT-RAD configured to exchange heat between the cooling water and outside air, the drive system heat exchanger configured to exchange heat with the drive system component e-PT driving a vehicle, and the second pump W/P (e-PT) configured to suction and discharge the cooling water, and configured to allow the cooling water to circulate therethrough; the first thermal coupler 4way_valve #1 configured to switch the cooling water circulating through the first cooling water circuit 31 and the cooling water circulating through the second cooling water circuit 32 between thermal coupling and separation; and the bypass circuit 35 including the three-way valve TW/V capable of blocking the flow of the cooling water, connected to the upstream and downstream of the external heat exchanger LT-RAD, and provided in parallel with the first cooling water circuit 31.

The cooling water that radiates heat by the external heat exchanger LT-RAD branches and flows into the storage battery heat exchanger of the first cooling water circuit 31 and the drive system heat exchanger of the second cooling water circuit 32.

In the cooling water circuit 30, the cooling water circuit can circulate in an order of the drive system heat exchanger, the storage battery heat exchanger, and the cooling water-refrigerant heat exchanger Chiller.

The first cooling water circuit 31 includes the third cooling water circuit 33 including the cooling water-refrigerant heat exchanger Chiller and configured to allow the cooling water to circulate therethrough, the fourth cooling water circuit 34 including the first pump W/P (Batt.) and the storage battery heat exchanger, and configured to allow the cooling water to circulate therethrough, the second thermal coupler 4way_valve #2 configured to switch the cooling water circulating through the third cooling water circuit 33 and the cooling water circulating through the fourth cooling water circuit 34 between thermal coupling and separation, and the third thermal coupler 4way_valve #3 configured to switch the cooling water circulating through the fourth cooling water circuit 34 and the cooling water circulating through the bypass circuit 35 between thermal coupling and separation. The first thermal coupler 4way_valve #1 can switch the second cooling water circuit 32 and the third cooling water circuit 33 between coupling and separation, and the cooling water that radiates heat by the external heat exchanger LT-RAD branches and flows into the drive system heat exchanger of the second cooling water circuit 32 and the storage battery heat exchanger of the fourth cooling water circuit 34.

The first cooling water circuit 31 includes the third cooling water circuit 33 including the cooling water-refrigerant heat exchanger Chiller and configured to allow the cooling water to circulate therethrough, the fourth cooling water circuit 34 including the first pump W/P (Batt.) and the storage battery heat exchanger, and configured to allow the cooling water to circulate therethrough, the second thermal coupler 4way_valve #2 configured to switch the cooling water circulating through the third cooling water circuit 33 and the cooling water circulating through the fourth cooling water circuit 34 between thermal coupling and separation, and the third thermal coupler 4way_valve #3 configured to switch the cooling water circulating through the fourth cooling water circuit 34 and the cooling water circulating through the bypass circuit 35 between thermal coupling and separation. When the first thermal coupler 4way_valve #1 couples the second cooling water circuit 32 and the third cooling water circuit 33, the second thermal coupler 4way_valve #2 couples the third cooling water circuit 33 and the fourth cooling water circuit 34, and the third thermal coupler 4way_valve #3 separates the fourth cooling water circuit 34 from the bypass circuit 35, the cooling water is circulatable in an order of the drive system heat exchanger, the storage battery heat exchanger, and the cooling water-refrigerant heat exchanger Chiller.

The third thermal coupler 4way_valve #3 and the three-way valve TW/V are disposed in series in a flow path of the bypass circuit 35.

The first thermal coupler 4way_valve #1 and the second thermal coupler 4way_valve #2 are disposed in series in a flow path of the third cooling water circuit 33.

The third cooling water circuit 33 includes the high-voltage hot water heater HVWH, and the high-voltage hot water heater HVWH is provided on the upstream side of the cooling water-refrigerant heat exchanger Chiller.

The bypass circuit 35 can switch between a bypass flow state in which a flow of the cooling water to the external heat exchanger LT-RAD in the second cooling water circuit 32 is bypassed and a parallel connection flow state in which the storage battery heat exchanger and the drive system heat exchanger are connected in parallel.

According to these configurations, it is possible to provide the temperature control system 100 that combines the refrigeration cycle circuit H/P and the cooling water circuit 30 and is capable of performing various types of control such as air conditioning, storage battery temperature control, and waste heat utilization with a simple configuration.

The third thermal coupler 4way_valve #3, the three-way valve TW/V, and the flow path 53f connecting the third thermal coupler 4way_valve #3 and the three-way valve TW/V are provided in the housing 53 of the integrated valve 50.

The first thermal coupler 4way_valve #1, the second thermal coupler 4way_valve #2, and the flow path 43g connecting the first thermal coupler 4way_valve #1 and the second thermal coupler 4way_valve #2 are provided in the housing 43 of the integrated valve 40.

According to these configurations, the cooling water circuit 30 can be made compact.

The invention claimed is:

1. A temperature control system for a vehicle, the temperature control system comprising:
    a refrigeration cycle circuit configured to allow a refrigerant to circulate therethrough; and
    a cooling water circuit configured to allow cooling water to circulate therethrough, wherein the refrigeration cycle circuit includes a compressor configured to compress the refrigerant, a radiator configured to heat air used for air conditioning using heat of the refrigerant compressed by the compressor, and a first heat exchanger configured to exchange heat between the refrigerant and the cooling water in the cooling water circuit, and
    the cooling water circuit includes:
        a first cooling water circuit including the first heat exchanger, a storage battery heat exchanger configured to exchange heat with a storage battery, and a first pump configured to suction and discharge the cooling water, and configured to allow the cooling water to circulate therethrough;
        a second cooling water circuit including an external heat exchanger configured to exchange heat between the cooling water and outside air, a drive system heat exchanger configured to exchange heat with a drive system component that drives the vehicle, and a second pump configured to suction and discharge the cooling water, and configured to allow the cooling water to circulate therethrough;

a first thermal coupler configured to switch the cooling water circulating through the first cooling water circuit and the cooling water circulating through the second cooling water circuit between thermal coupling and separation; and a bypass circuit including an on-off valve capable of blocking a flow of the cooling water, connected to upstream and downstream of the external heat exchanger, and provided in parallel with the first cooling water circuit.

2. The temperature control system according to claim 1, wherein the cooling water that radiates heat by the external heat exchanger branches and flows into the storage battery heat exchanger of the first cooling water circuit and the drive system heat exchanger of the second cooling water circuit.

3. The temperature control system according to claim 1, wherein, in the cooling water circuit, the cooling water is circulatable in an order of the drive system heat exchanger, the storage battery heat exchanger, and the first heat exchanger.

4. The temperature control system according to claim 1, wherein the first cooling water circuit includes:
    a third cooling water circuit including the first heat exchanger and configured to allow the cooling water to circulate therethrough;
    a fourth cooling water circuit including the first pump and the storage battery heat exchanger and configured to allow the cooling water to circulate therethrough;
    a second thermal coupler configured to switch the cooling water circulating through the third cooling water circuit and the cooling water circulating through the fourth cooling water circuit between thermal coupling and separation; and
    a third thermal coupler configured to switch the cooling water circulating through the fourth cooling water circuit and the cooling water circulating through the bypass circuit between thermal coupling and separation,
    the first thermal coupler is capable of switching the second cooling water circuit and the third cooling water circuit between coupling and separation, and
    the cooling water that radiates heat by the external heat exchanger branches and flows into the drive system heat exchanger of the second cooling water circuit and the storage battery heat exchanger of the fourth cooling water circuit.

5. The temperature control system according to claim 1, wherein the first cooling water circuit includes:
    a third cooling water circuit including the first heat exchanger and configured to allow the cooling water to circulate therethrough;
    a fourth cooling water circuit including the first pump and the storage battery heat exchanger and configured to allow the cooling water to circulate therethrough;
    a second thermal coupler configured to switch the cooling water circulating through the third cooling water circuit and the cooling water circulating through the fourth cooling water circuit between thermal coupling and separation; and
    a third thermal coupler configured to switch the cooling water circulating through the fourth cooling water circuit and the cooling water circulating through the bypass circuit between thermal coupling and separation, and
    when the first thermal coupler couples the second cooling water circuit and the third cooling water circuit, the second thermal coupler couples the third cooling water circuit and the fourth cooling water circuit, and the third thermal coupler separates the fourth cooling water circuit from the bypass circuit, the cooling water is circulatable in an order of the drive system heat exchanger, the storage battery heat exchanger, and the first heat exchanger.

6. The temperature control system according to claim 5, wherein the third thermal coupler and the on-off valve are disposed in series in a flow path of the bypass circuit.

7. The temperature control system according to claim 6, wherein the third thermal coupler, the on-off valve, and the flow path connecting the third thermal coupler and the on-off valve are provided in a housing of an integrated valve.

8. The temperature control system according to claim 5, wherein the first thermal coupler and the second thermal coupler are disposed in series in a flow path of the third cooling water circuit.

9. The temperature control system according to claim 8, wherein the first thermal coupler, the second thermal coupler, and the flow path connecting the first thermal coupler and the second thermal coupler are provided in a housing of an integrated valve.

10. The temperature control system according to claim 4, wherein
    the third cooling water circuit includes a cooling water heater, and
    the cooling water heater is provided upstream of the first heat exchanger.

11. The temperature control system according to claim 1, wherein the bypass circuit is switchable between a bypass flow state in which a flow of the cooling water to the external heat exchanger in the second cooling water circuit is bypassed and a parallel connection flow state in which the storage battery heat exchanger and the drive system heat exchanger are connected in parallel.

12. The temperature control system according to claim 4, wherein the first cooling water circuit includes:
    the third cooling water circuit including the first heat exchanger and configured to allow the cooling water to circulate therethrough;
    the fourth cooling water circuit including the first pump and the storage battery heat exchanger and configured to allow the cooling water to circulate therethrough;
    the second thermal coupler configured to switch the cooling water circulating through the third cooling water circuit and the cooling water circulating through the fourth cooling water circuit between thermal coupling and separation; and
    the third thermal coupler configured to switch the cooling water circulating through the fourth cooling water circuit and the cooling water circulating through the bypass circuit between thermal coupling and separation, and
    when the first thermal coupler couples the second cooling water circuit and the third cooling water circuit, the second thermal coupler couples the third cooling water circuit and the fourth cooling water circuit, and the third thermal coupler separates the fourth cooling water circuit from the bypass circuit, the cooling water is circulatable in an order of the drive system heat exchanger, the storage battery heat exchanger, and the first heat exchanger.

\* \* \* \* \*